United States Patent [19]

Nakamura

[11] Patent Number: 5,329,372
[45] Date of Patent: Jul. 12, 1994

[54] PHOTOELECTRIC CONVERSION DEVICE

[75] Inventor: Tsutomu Nakamura, Ina, Japan

[73] Assignee: Olympus Optical Co., Ltd., Tokyo, Japan

[21] Appl. No.: 698,223

[22] Filed: May 10, 1991

[30] Foreign Application Priority Data

May 16, 1990 [JP] Japan .................. 2-124272

[51] Int. Cl.$^5$ .............................. H04N 3/14
[52] U.S. Cl. .................... 348/302; 348/307
[58] Field of Search ............ 358/213.11, 213.13, 358/213.15, 213.16, 213.17, 213.18, 213.19, 213.12, 213.27

[56] References Cited

U.S. PATENT DOCUMENTS

| | | | |
|---|---|---|---|
| 4,189,751 | 2/1980 | Nagumo | 358/213 |
| 4,634,886 | 1/1987 | Hatanaka et al. | 250/578 |
| 4,678,938 | 7/1987 | Nakamura | 307/311 |
| 4,684,992 | 8/1987 | Nakamura et al. | 358/213.12 |
| 4,819,071 | 4/1989 | Nakamura | 358/213.16 |
| 4,914,519 | 4/1990 | Hashimoto et al. | 358/213.18 |
| 4,945,418 | 7/1990 | Mutoh | 358/213.11 |

OTHER PUBLICATIONS

Applicant's submitted Prior Art (FIGS. 1-3).

Primary Examiner—Michael T. Razavi
Assistant Examiner—Wendy R. Greening
Attorney, Agent, or Firm—Armstrong, Westerman, Hattori, McLeland & Naughton

[57] ABSTRACT

A photoelectric conversion device comprises a control circuit for applying a control signal to a control electrode of a photoelectric transducer, an operating point detection circuit for receiving an output signal from the photoelectric transducer and inverting an output state thereof depending on a level of the output signal, and a sample/hold circuit controlled by an output of the operating point detection circuit to hold a signal level corresponding to the control signal as developed when the output state of the operating point detection circuit is inverted, the signal held by the sample/hold circuit being read as a photoelectrically converted output. Photoelectric conversion characteristics thereby exhibits good linearity.

7 Claims, 26 Drawing Sheets

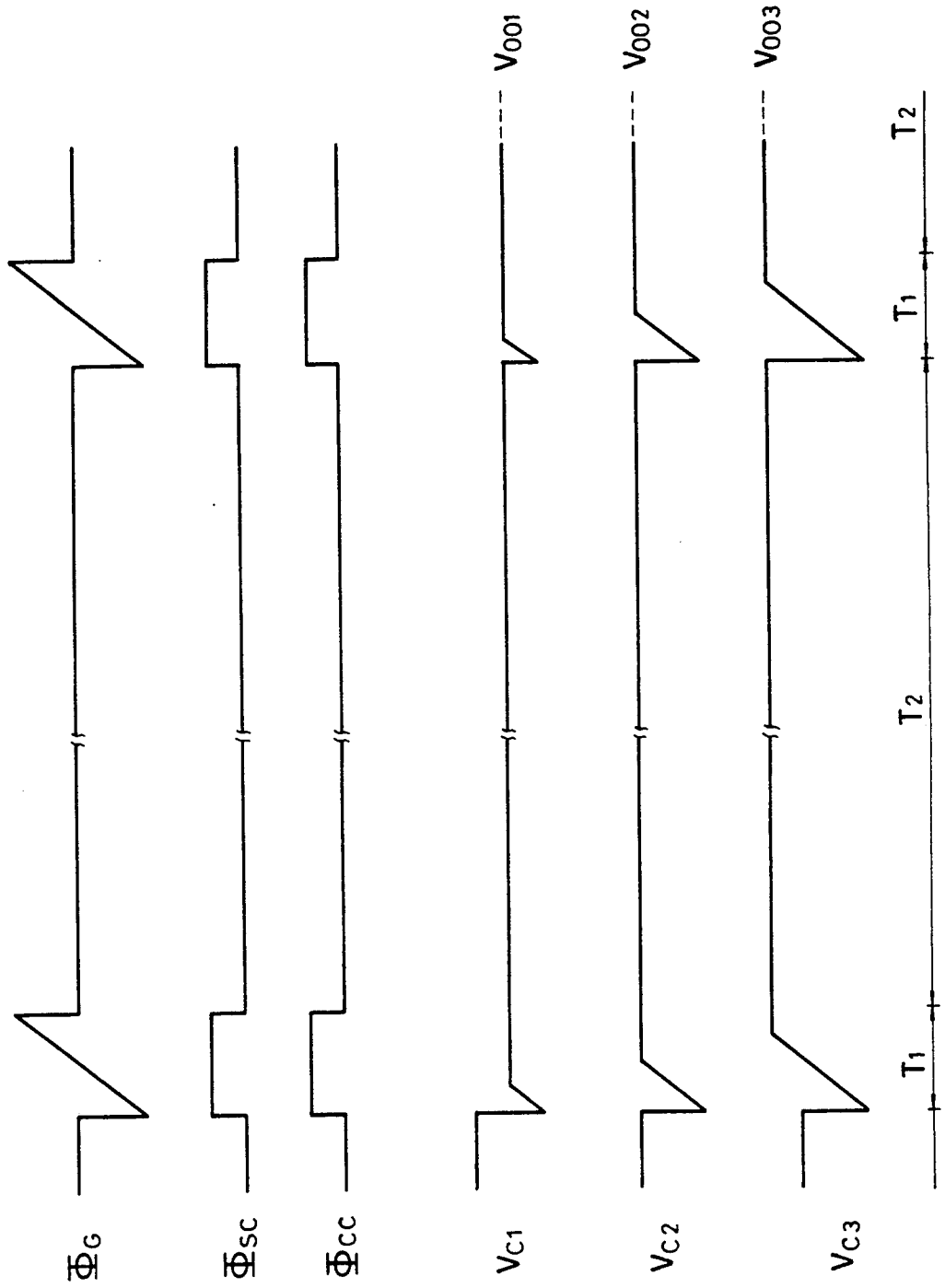

PHOTOELECTRIC CONVERSION DEVICE

BACKGROUND OF THE INVENTION

This invention relates to a photoelectric conversion device using Charge Modulation Devices (hereinafter abbreviated as CMDs) or photoelectric transducers which have a like amplifying function.

While a solid state image sensor using CMDs as pixels is known to the public as disclosed in IEDM Tech. Dig. pp. 353-356, 1986, the basic operation of reading an image pick-up signal will be first explained. FIG. 1 is an equivalent circuit diagram showing a state when the signal is read out of one CMD. A gate 4 of a CMD 1 providing each pixel is connected to an output terminal of a gate control circuit 5, a drain 2 of the CMD 1 is connected to a drain bias (not shown), and a source 3 of the CMD 1 is connected to a current/voltage conversion circuit with a virtual ground input which comprises an operational amplifier 6 and a feedback resistor 7.

FIG. 2 is a chart of signal waveforms for explaining basic readout operation of the CMD solid state image sensor shown in FIG. 1. The gate control circuit 5 in FIG. 1 outputs a gate control pulse $\Phi_G$ comprising three values; i.e., integrating potential $V_{INT}$, readout potential $V_{RD}$ and reset potential $V_{RST}$, as shown in FIG. 2. If the CMD 1 is exposed by a beam of light 10 under a condition that the integrating potential $V_{INT}$ is applied to the gate, the source current corresponding to an exposure amount so far exposed flows through the CMD 1 when the gate potential is set to the readout potential $V_{RD}$.

Such a behavior is depicted in a graph of FIG. 3 showing operating characteristics of the CMD. A characteristic curve 9-1 corresponds to a source current characteristic when the exposure amount is zero, i.e., in a dark state, and characteristic curves 9-2, 9-3 correspond to respective source current characteristics as developed when the exposure amount is gradually increased. Therefore, assuming that the feedback resistor 7 has a resistance value $R_f$, output voltage $V_{OUT}$ at an output terminal 8 of the current/voltage conversion circuit is given below for each of the characteristic curves 9-1, 9-2 and 9-3:

$$V_1' = -I_1 \cdot R_f \quad (1)$$

$$V_2' = -I_2 \cdot R_f \quad (2)$$

$$V_3' = -I_3 \cdot R_f \quad (3)$$

However, the technique of reading a source current which flows when the read potential $V_{RD}$ is applied to the gate terminal, as stated above, has suffered from the disadvantages described below. Because a potential change in the gate field surface of the CMD caused depending on the exposure amount modulated and outputted in accordance with the CMD's transistor characteristics, photoelectric conversion characteristics deviate from a linear line, and the sensor output may fluctuate in spite of the exposure amount held constant if temperatures are changed. Another disadvantage is that because the CMD's characteristics for modulating potential change in the gate field surface, caused depending on the exposure amount, into a source current are different from pixel to pixel, variations in the characteristics of each CMD lead to the fixed pattern noise in a video output signal and the performance of the image sensor is deteriorated.

SUMMARY OF THE INVENTION

The present invention has been made with a view to solving the above problems in the conventional photoelectric conversion device using CMDs as photoelectric transducers. An object of the present invention is to provide a photoelectric conversion device in which the photoelectric conversion characteristics exhibit good linearity, a stable output is obtained regardless of temperature changes, and the fixed pattern noise is reduced.

To solve the above problems, the present invention provides a photoelectric conversion device including at least one photoelectric transducer with an amplifying function which has region for integrating electric charges produced by light therein and a control electrode capacity-coupled to the region, the photoelectric conversion device comprising a control circuit for applying a monotonously changing control signal to a control electrode of said photoelectric transducer, an operating point detection circuit for receiving an output signal from said photoelectric transducer and inverting an output state thereof depending on a level of said output signal, and a sample/hold circuit controlled by an output of said operating point detection circuit to hold a signal level corresponding to said monotonously changing control signal applied to the control electrode of said photoelectric transducer as developed when the output state of said operating point detection circuit is inverted, wherein the signal held by said sample/hold circuit is read out as a photoelectrically converted output.

With such an arrangement, the operating point detection circuit causes the sample/hold circuit to hold, as a photoelectrically converted signal, the control voltage required to flow a predetermined output current through the photoelectric transducer, and the photoelectrically converted signal thus held is read as an output signal. This makes the photoelectrically converted signal always proportional to only the electric charges which are produced by light and integrated in the photoelectric transducer. As a result, photoelectric characteristics representing the relation between exposure amount and the output signal exhibit very good linearity, and the stable output signal can be obtained regardless of temperature changes.

Further, by arranging photoelectric transducers into the form of a matrix to make up a pixel array, and differentially calculating signals held in first and second sample/hold circuits to produce the photoelectrically converted signal, as described in claim 4, it is possible to reduce the fixed pattern noise caused by variations in characteristics of the respective photoelectric transducers making up the pixel array.

BRIEF DESCRIPTION OF THE DRAWINGS

FIG. 32 is a chart of signal waveforms at various points for explaining operation of the tenth embodiment.

DESCRIPTION OF EMBODIMENTS OF THE INVENTION

Figure 1:
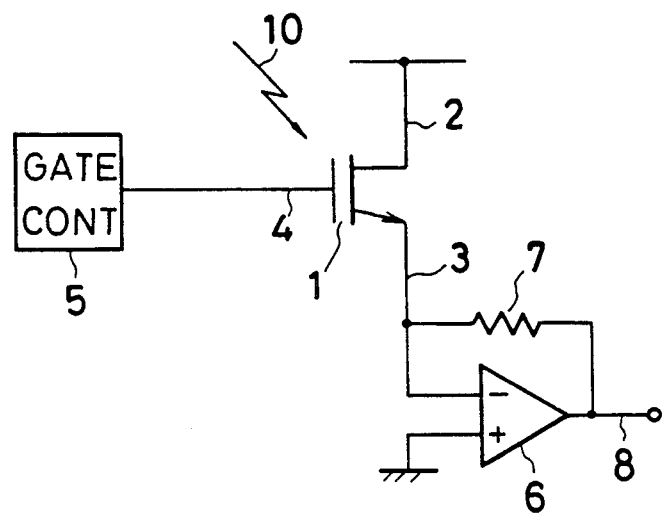
FIG. 1 is circuit diagram showing a CMD photoelectric conversion device of the prior art.
Figure 2:
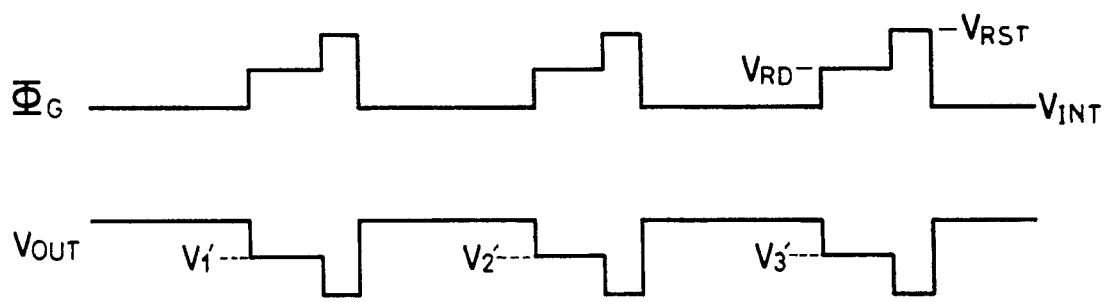
FIG. 2 is a chart of signal waveforms at various points for explaining operation of the prior art device.
Figure 3:
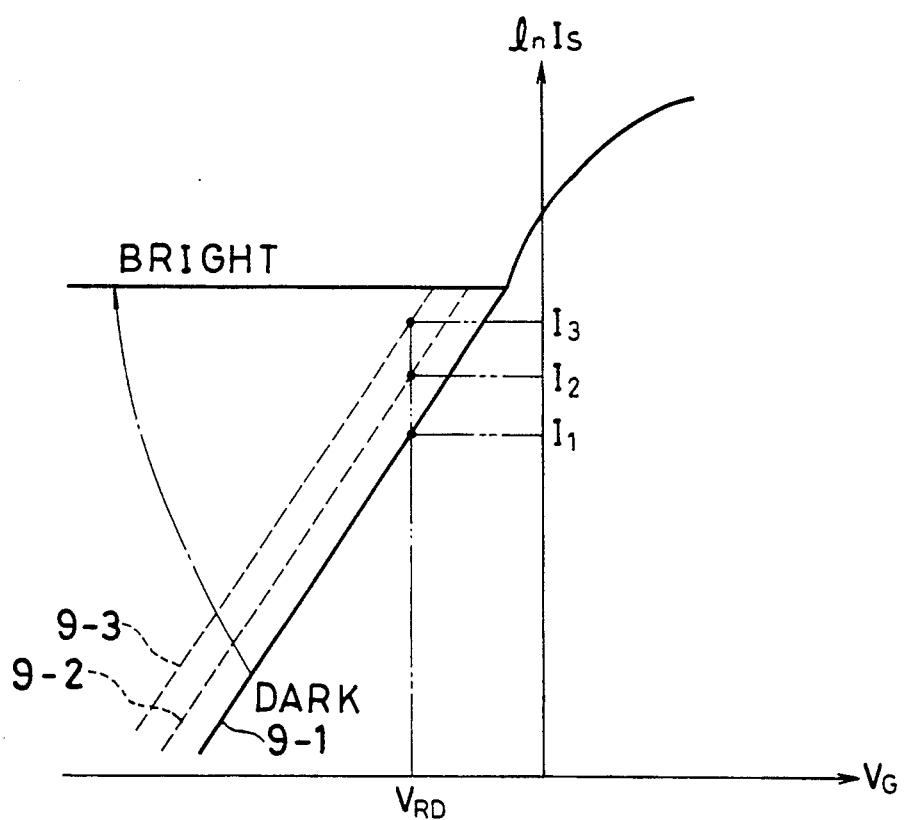
FIG. 3 is a graph showing operating characteristics of a CMD in the prior art.
Figure 4:
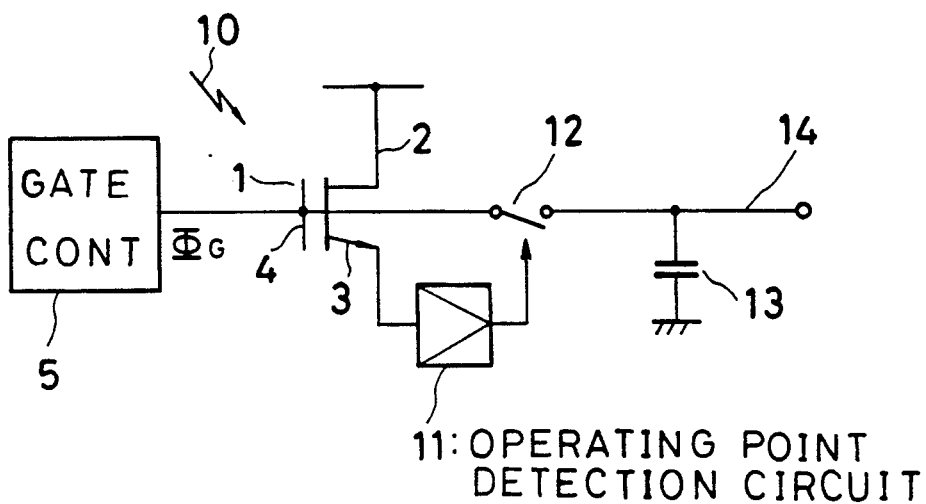
FIG. 4 is a circuit diagram showing a first embodiment of the present invention.

Hereinafter, the present invention will be described in conjunction with embodiments. FIG. 4 is an equivalent circuit diagram showing a first embodiment of a photoelectric conversion device according to the present invention. Parts having the same functions as those in the conventional device shown in FIG. 1 are denoted by the same reference numerals and will not be here described. A CMD 1 has a gate 4 connected to an output terminal of a gate control circuit 5, and a source 3 connected to an operating point detection circuit 11 for the CMD 1. An output of the operating point detection circuit 11 controls opening and closing operation of a switch 12, one terminal of which is connected to the gate 4 of the CMD 1 driven by an output from the gate control circuit 5, and the other terminal of which is connected to a potential integrating capacitor 13 to provide an output terminal 14. In this connection, a signal inputted to the gate 4 of the CMD 1 and a signal inputted to the potential integrating capacitor 13 may not be related with each other by a common wiring, so long as those two signals are held in one-to-one corresponding relation.

Figure 5:
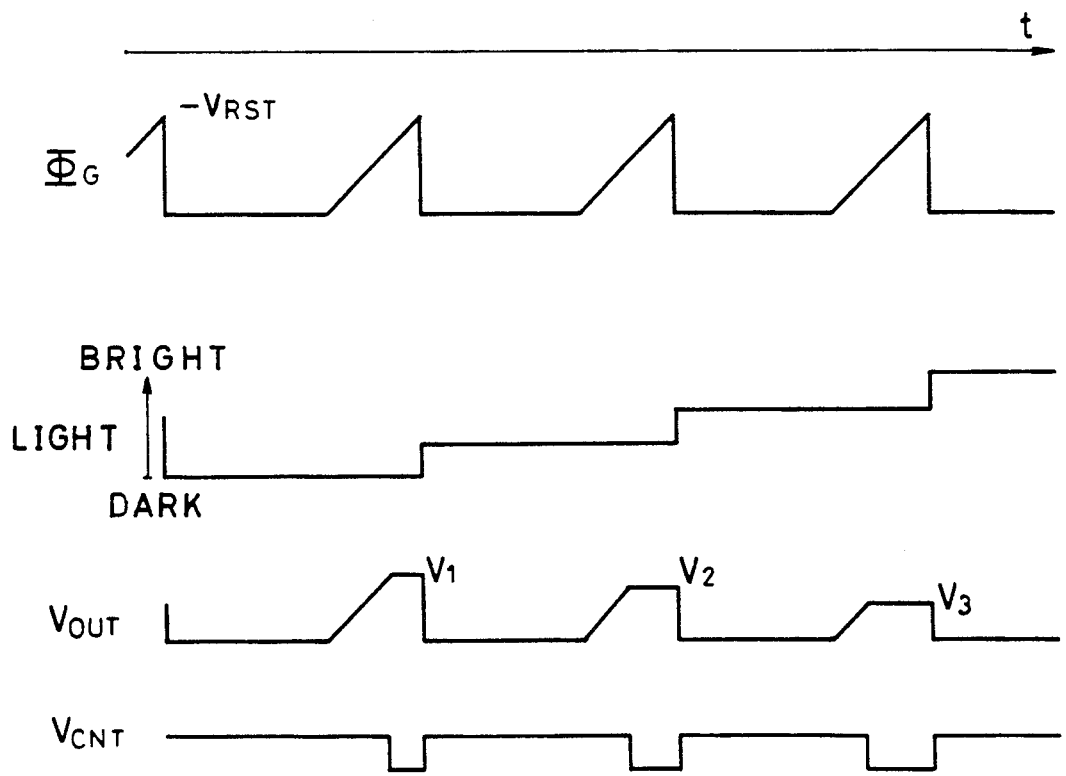
FIG. 5 is a chart of signal waveforms at various points for explaining operation of the first embodiment.

FIG. 5 is a chart of signal waveforms for explaining basic readout operation of the CMD photoelectric conversion device shown in FIG. 4. The gate control circuit 5 delivers an output pulse $\Phi_G$ in the form of a sawtooth wave such that the output pulse takes integrating potential $V_{INT}$ for one period and changes from the integrating potential $V_{INT}$ to reset potential $V_{RST}$ for the other period, as shown in FIG. 5. The operating point detection circuit 11 is designed to change its output at a predetermined operating point in the course of transition of the CMD 1 from an off-state to an on-state. Accordingly, the potential corresponding to the predetermined operating point of the CMD 1 is sampled and held in the potential integrating capacitor 13 based on the potential of the gate pulse outputted in the form of a sawtooth wave. In other words, if the gate pulse $\Phi_G$ outputted in the form of a sawtooth wave is applied to the gate 4 such that the CMD 1 is exposed while applying the integrating potential $V_{INT}$ to the gate 4, the operating point detection circuit 11 is operated depending on the exposure amount so far exposed, whereby the gate potential corresponding to the exposure amount per gate pulse is sampled and held in the potential integrating capacitor 13 and outputted as an output voltage $V_{OUT}$ from the output terminal 14. Note that, in FIG. 5, $V_{CNT}$ denotes output voltage of the operating point detection circuit 11.

Figure 6:
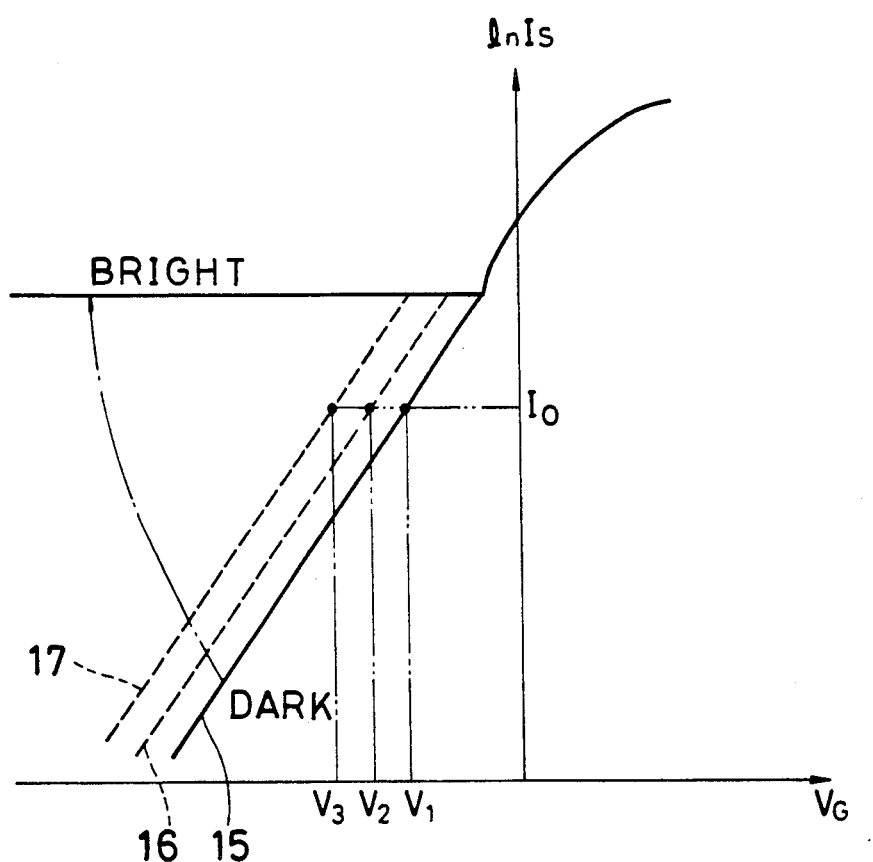
FIG. 6 is a graph showing operating characteristics of the CMD in the first embodiment.

Such a behavior is depicted in a graph of FIG. 6 showing operating characteristics of the CMD. A characteristic curve 15 corresponds to a source current characteristic when the exposure amount is zero, i.e., in a dark state, and characteristic curves 16, 17 correspond to respective source current characteristics as developed when the exposure amount is gradually increased. Thus, the gate voltages $V_1$, $V_2$, $V_3$ corresponding to the respective exposure amounts are outputted. Meanwhile, in FIG. 6, the characteristic curve 16 in a bright state is given by shifting the characteristic curve 15 in a dark state by $V_2 - V_1$ along the axis indicative of the gate voltage. Assuming that the number of holes produced by light and integrated under a gate electrode of the CMD 1 is $n_H$, the capacity of a gate insulating film of the CMD 1 is $C_{OX}$, and the elementary electric charge is q, an amount of the above shift is expressed below:

$$n_H \cdot q = C_{OX} \cdot (V_1 - V_2) \tag{4}$$

$$V_2 = -n_H \cdot q / C_{OX} + V_1 \tag{5}$$

This implies that the signal voltage $V_2$ is proportional to the number $n_H$ of the holes integrated. In other words, with the readout means o$ this embodiment, since the output signal takes a level proportional to the hole number $n_H$ and the proportional constant is determined by only the capacity $C_{OX}$ of the gate insulating film of the CMD 1 and the elementary electric charge q as expressed by the equation (5), photoelectric conversion characteristics representing the relation between the exposure amount and the output signal exhibits very good linearity.

Figure 7:
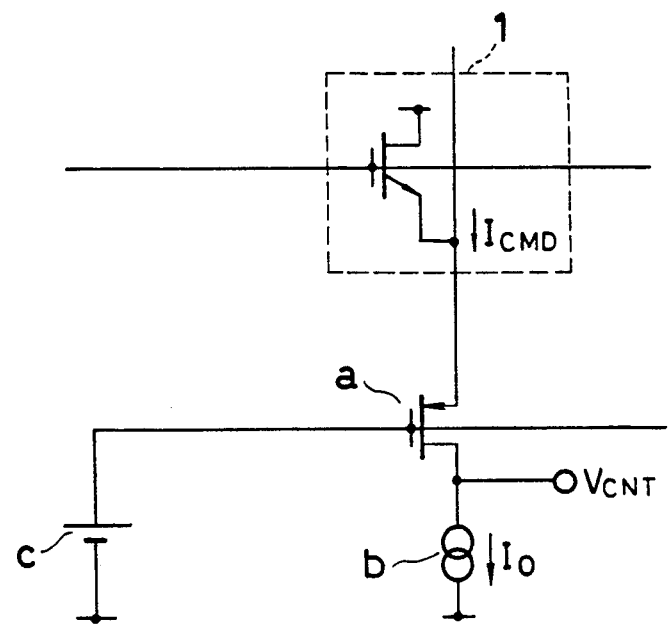
FIG. 7 is a diagram showing one example of configuration of an operating point detection circuit.

The operating point detection circuit can be arranged as shown in FIG. 7. Referring to FIG. 7, denoted by a is a P-MOS transistor, b is a constant-current circuit, and c is a bias source. If an output current $I_{CMD}$ of the CMD 1 meets $I_{CMD}<I_O$, the P-MOS transistor a is turned off and the operating point detection output $V_{CNT}$ takes a low level (Low). If $I_{CMD}>I_O$ holds, the P-MOS transistor a is turned on and the operating point detection output $V_{CNT}$ goes to a high level (High) so that the operating point is detected.

Figure 8:
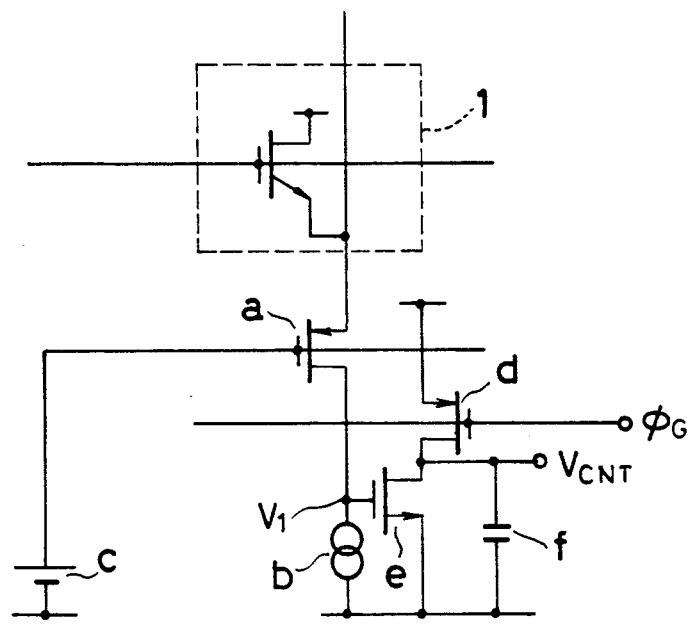
FIG. 8 is a diagram showing another example of configuration of the operating point detection circuit.

Further, the operating point detection circuit may be modified as shown in FIG. 8 by adding another P-MOS transistor d, an N-MOS transistor e, and a capacitor f to the circuit shown in FIG. 7 for purpose of increasing the gain. With the operating point detection circuit shown in FIG. 8, prior to the detecting operation, the gate potential $\Phi_G$ of the P-MOS transistor d is once turned to Low to charge the capacitor f into a high level. Afterward, when $\Phi_G$ goes to High and the gate potential $V_1$ of the N-MOS transistor e turns from Low to High, the operating point detection output $V_{CNT}$ is quickly turned from High to Low while being multiplied by the N-MOS transistor e.

Figure 9A:
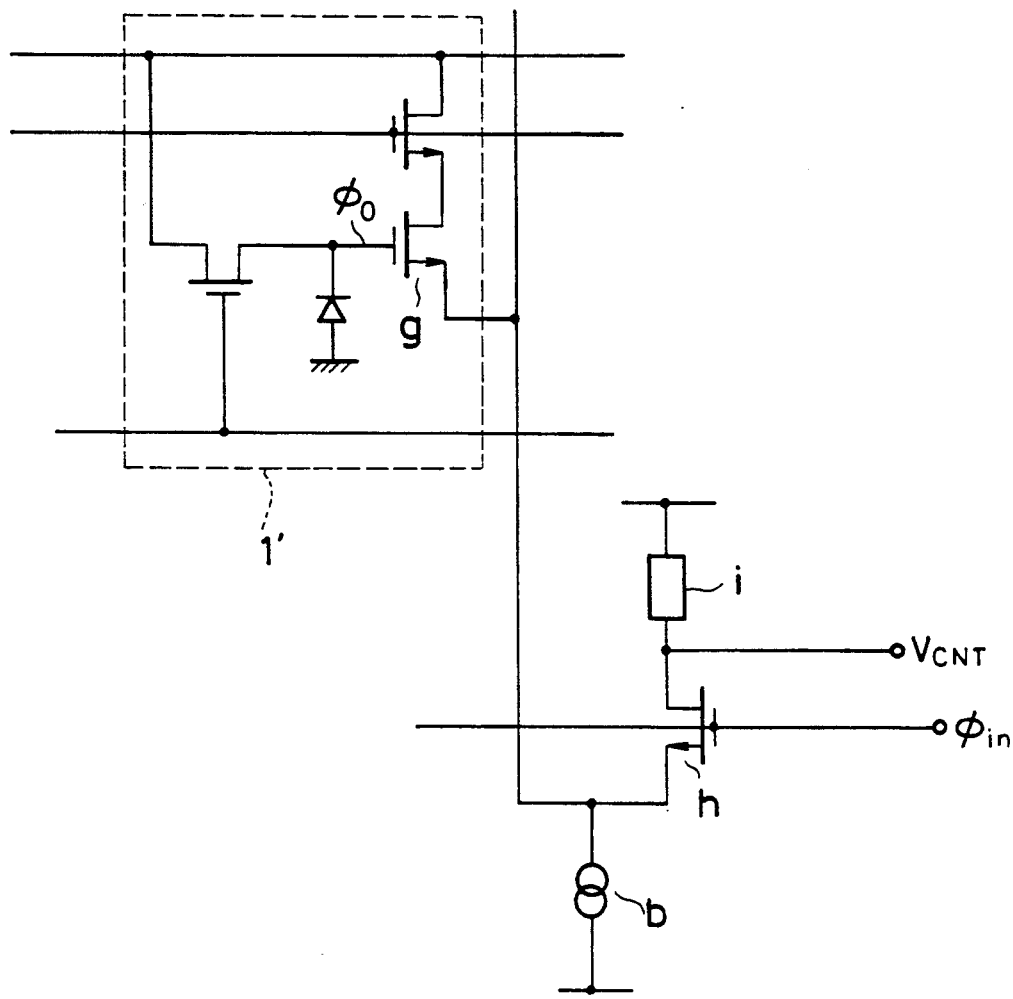
FIG. 9A is a diagram showing still another example of configuration of the operating point detection circuit.
Figure 9B:
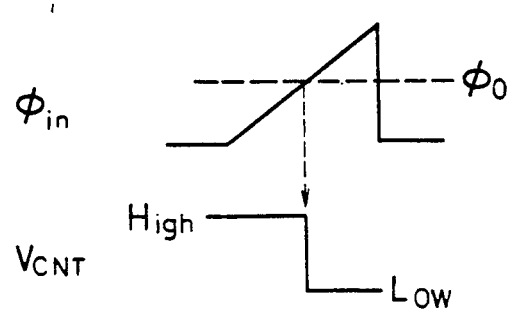
FIG. 9B is a chart of signal waveforms for explaining operation of the circuit in FIG. 9A.

Furthermore, the operating point detection circuit having such a circuit configuration as shown in FIG. 9A is used for an AMI type photoelectric transducer 1'. Specifically, an N-MOS transistor g as an amplifying transistor of the photoelectric transducer 1' and an N-MOS transistor h of the operating point detection circuit jointly constitute a differential amplifier. In FIG. 9A, denoted by i is a load connected to the N-MOS transistor h. In the operating point detection circuit thus arranged, a gate pulse $\Phi_{in}$ which monotonously increases or decreases like a triangular wave as shown in FIG. 9B, for example, is applied to a gate of the N-MOS transistor h. Under this condition when $\Phi_{in}=\Phi_0$ ($\Phi_0$: gate potential of the N-MOS transistor g), the detection output $V_{CNT}$ is switched from High to Low so that the operating point is detected.

Next, a second embodiment of the present invention will be described with reference to FIG. 10. The same or identical parts as those in the first embodiment shown in FIG. 4 are denoted by the same reference numerals. The CMD 1 has the gate 4 connected to the output terminal of the gate control circuit 5, and the source 3 connected to an operating point detection circuit 21 for the CMD 1. The operating point detection circuit 21 comprises a load 22 for detecting a source current and a capacitor 23 for AC coupling, the load 22 and the capacitor 23 having their one ends connected to the source 3 of the CMD 1, as well as an inverter 24 operating as a voltage comparator and an auto-zero switch 25 for setting an input terminal of the inverter 24 to decision voltage of the inverter 24, the inverter 24 and the auto-zero switch 25 being both connected to the other end of the AC-coupling capacitor 23. An output terminal of the inverter 24, of which input terminal is connected to the AC coupling capacitor 23, is connected to the other end of the auto-zero switch 25. Opening and closing operations of the auto-zero switch 25 is controlled by a control signal $\Phi_{CNT}$ inputted to its control terminal 26. An output 27 of the operating point detection circuit 21 controls opening and closing operations of the switch 12 which has one end connected to the gate 4 of the CMD 1 driven by the output from the gate control circuit 5, and the other end connected to the potential integrating capacitor 13 to provide the output terminal 14.

Figure 10:
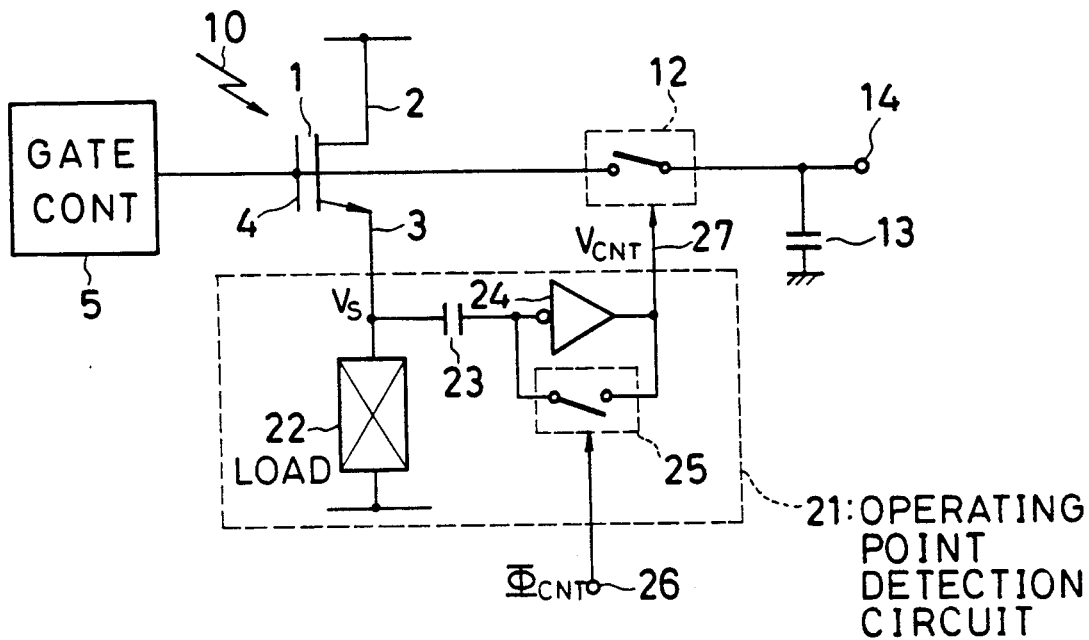
FIG. 10 is a circuit diagram showing a second embodiment.
Figure 11:
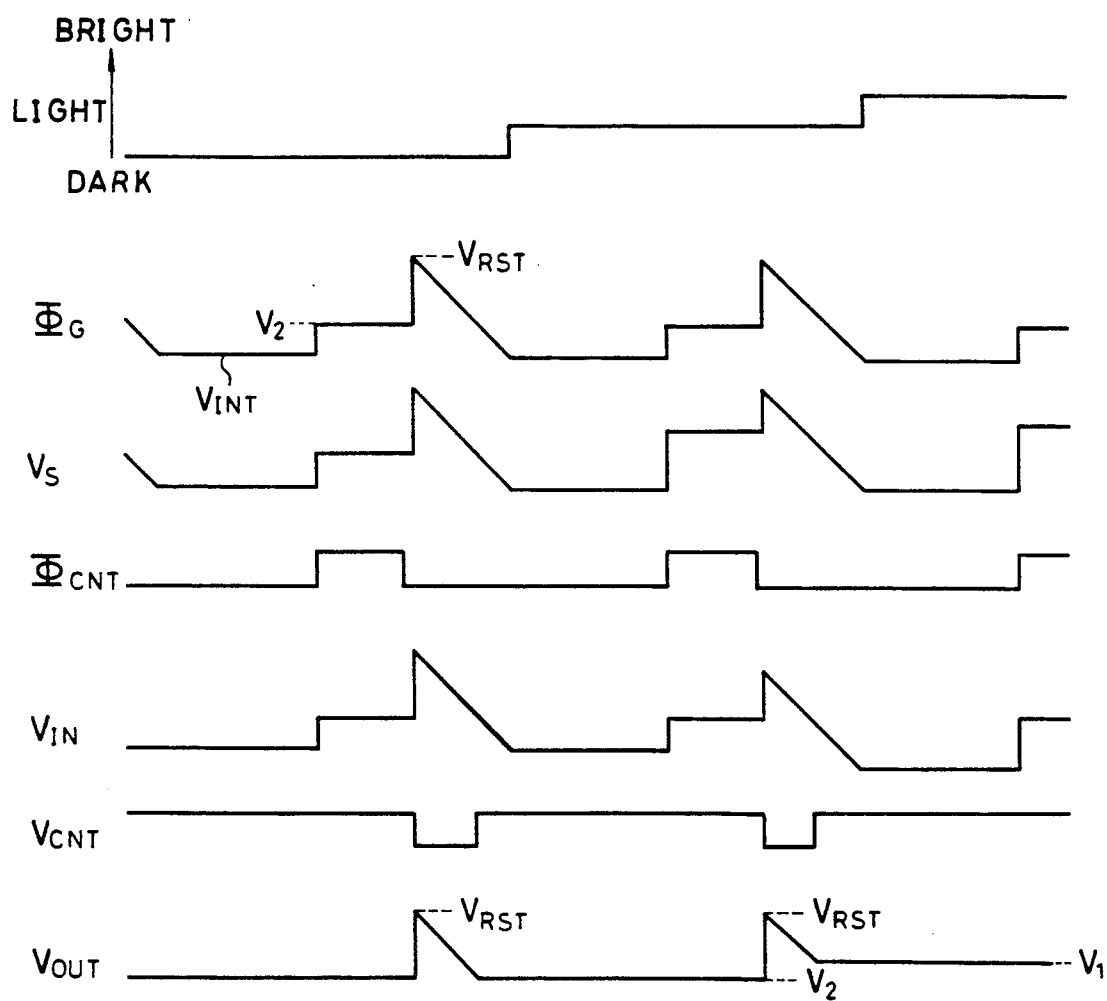
FIG. 11 is a chart of signal waveforms at various points for explaining operation of the second embodiment.

FIG. 11 is a chart of signal waveforms for explaining basic read operation of the CMD photoelectric conversion device shown in FIG. 10. The gate control circuit 5 in FIG. 10 delivers an output pulse $\Phi_G$ in the form of a sawtooth wave such that the output pulse takes integrating potential $V_{INT}$ for one some period and read potential $V_2$ for other some period, and changes from reset potential $V_{RST}$ to the integrating potential $V_{INT}$ for the remaining period, as shown in FIG. 11. The operating point detection circuit 21 is designed to change its output at a predetermined operating point in the course of transition of the CMD from an on-state to an off-state.

When the gate pulse $\Phi_G$ from the gate control circuit 5 reaches the readout potential $V_2$, the source current is changed depending on the exposure amount so far exposed, and its current value leads to a potential change $V_S$ through the load 22. At this time, the auto-zero switch 25 is turned on by the control signal $\Phi_{CNT}$ inputted from the control terminal 26 for setting the input terminal of the inverter 24, which operates as a voltage comparator, to the decision voltage. Therefore, the potential $V_S$ corresponding to the source current, which flows depending on an exposed state of the CMD 1, and the decision voltage are applied to the opposite ends of the AC-coupling capacitor 23, respectively, so that differential voltage therebetween is charged in the capacitor 23. Then, after the auto-zero switch 25 is turned off by the control signal $\Phi_{CNT}$ inputted from the control terminal 26, the operating point detection circuit 21 detects the operating point determined by the source current which flows depending on the exposed state as mentioned above.

On the other hand, when the output pulse $\Phi_G$ reaches the reset potential $V_{RST}$, holes produced by light and integrated below the gate field surface of the CMD 1 are discharged to perform reset operation. Then, as $\Phi_G$ lowers from the reset potential $V_{RST}$, the source current of the CMD 1 now under a dark state starts descending. When the source current reaches the operating point previously set by operation of the auto-zero switch 25, the output $V_{CNT}$ of the operating point detection circuit 21 is inverted. As a result, the potential corresponding to the predetermined operating point of the CMD 1 in a dark state is sampled and held in the potential integrating capacitor 13 based on the potential of the gate pulse $\Phi_G$ outputted in the form of a sawtooth wave.

Figure 12:
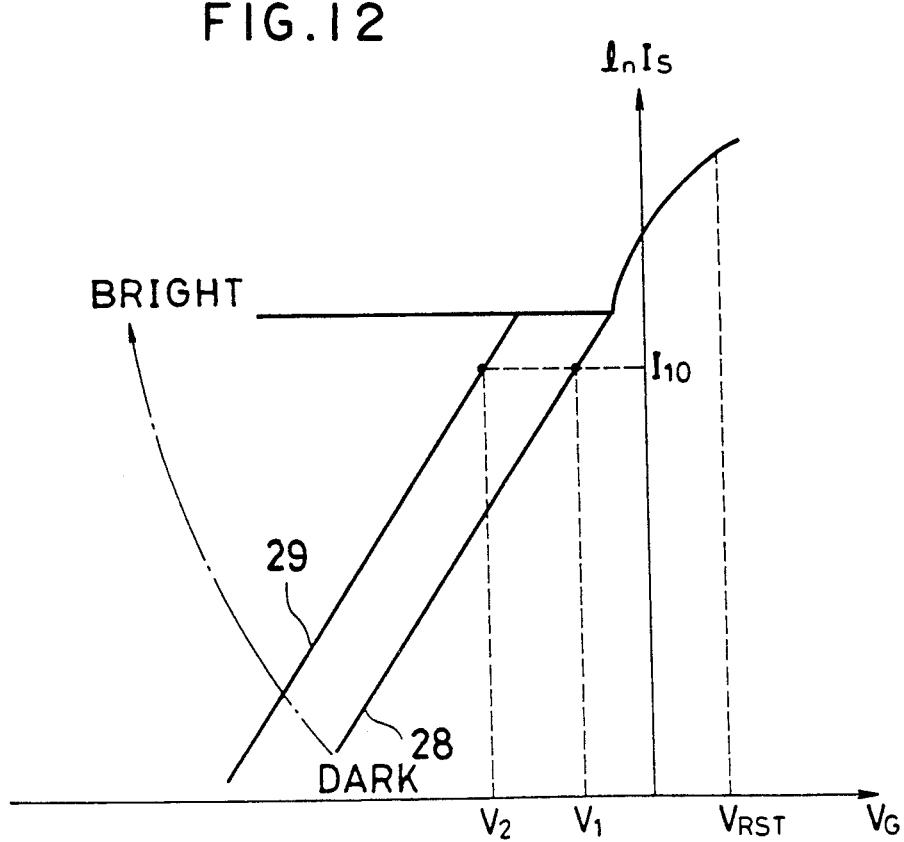
FIG. 12 is a graph showing operating characteristics of the CMD in the second embodiment.

Such a behavior is depicted in a graph of FIG. 12 showing operating characteristics of the CMD. A characteristic curve 28 corresponds to a source current characteristic when the exposure amount is zero, i.e., in a dark state, and a characteristic curve 29 corresponds to a source current characteristic in a bright state. Since the decision point of the operating point detection circuit 21 is set at a point of $V_G=V_2$ on the characteristic line 29 under exposure, the operating point is set at a point where the source current meets $I_S=I_{10}$. Therefore, the gate potential $V_1$ required to flow the source current corresponding to that developed under exposure through the CMD in a dark state is sampled and held in the potential integrating capacitor 13.

Meanwhile, in FIG. 12, the characteristic curve 29 in a bright state is given by shifting the characteristic curve 28 in a dark state by $V_2-V_1$ along the axis indicative of the gate voltage. Assuming that the number of holes produced by light and integrated under the CMD's gate electrode is $n_H$, the capacity of the CMD's gate insulating film is $C_{OX}$, and the elementary electric charge is q, an amount of the above shift is expressed below:

$$n_H \cdot q = C_{OX} \cdot (V_1 - V_2) \quad (6)$$

$$V_1 = n_H \cdot q / C_{OX} + V_2 \quad (7)$$

This implies that $V_1$ is proportional to the number $n_H$ of the holes integrated. In other words, with the read means of this embodiment, the output signal is determined by both a quantity proportional to the hole number $n_H$ and a constant term $V_2$ as expressed by the equation (7). Also, the proportional constant is determined by only the capacity $C_{OX}$ of the gate insulating film of the CMD 1 and the elementary electric charge q. The constant term other than the proportional term is determined by only the read potential $V_2$ given from $\Phi_G$, and its value can be known in real time because it is set externally. Therefore, this embodiment is equivalent to observe $V_1-V_2$ and so the measured result is less affected by variations in the CMD's characteristics. Consequently, photoelectric conversion characteristics representing the relation between the exposure amount and the output signal exhibits very good linearity, and the stable output signal can be obtained regardless of temperature changes.

Next, a third embodiment of the present invention will be described with reference to FIG. 13. The CMD 1 has the gate 4 connected to the output terminal of the gate control circuit 5, and the source 3 connected to an operating point detection circuit 31 for the CMD 1. An output 32 of the operating point detection circuit 31 is applied to a gate circuit 35 of which inputs are given by a control terminal 33 and the output 32, and also to a gate circuit 36 of which inputs are given by a control terminal 34 and the output 32. An output of the gate circuit 35 controls opening and closing operations of a switch 37 which has one end connected to the gate 4 of the CMD 1 driven by the output from the gate control circuit 5, and the other end connected to a potential integrating capacitor 39 to provide an output terminal 41. Further, an output of the gate circuit 36 controls opening and closing operations of a switch 38 which has one end connected to the gate 4 of the CMD 1 driven by the output from the gate control circuit 5, and the other end connected to a potential integrating capacitor 40 to provide an output terminal 42.

Figure 13:
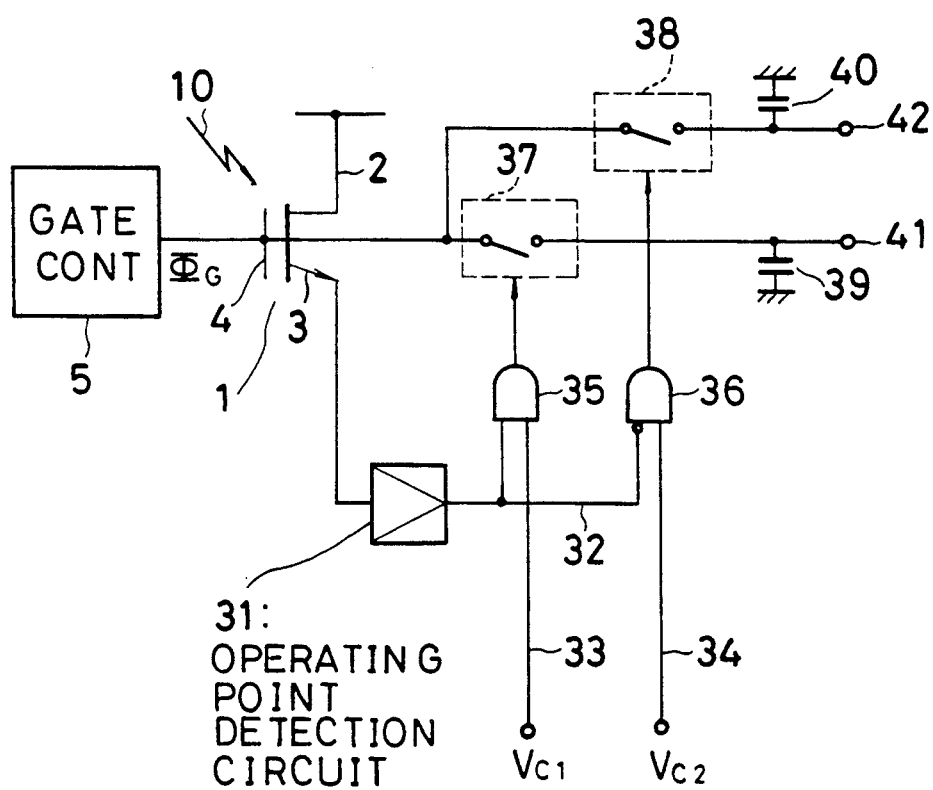
FIG. 13 is a circuit diagram showing a third embodiment.
Figure 14:
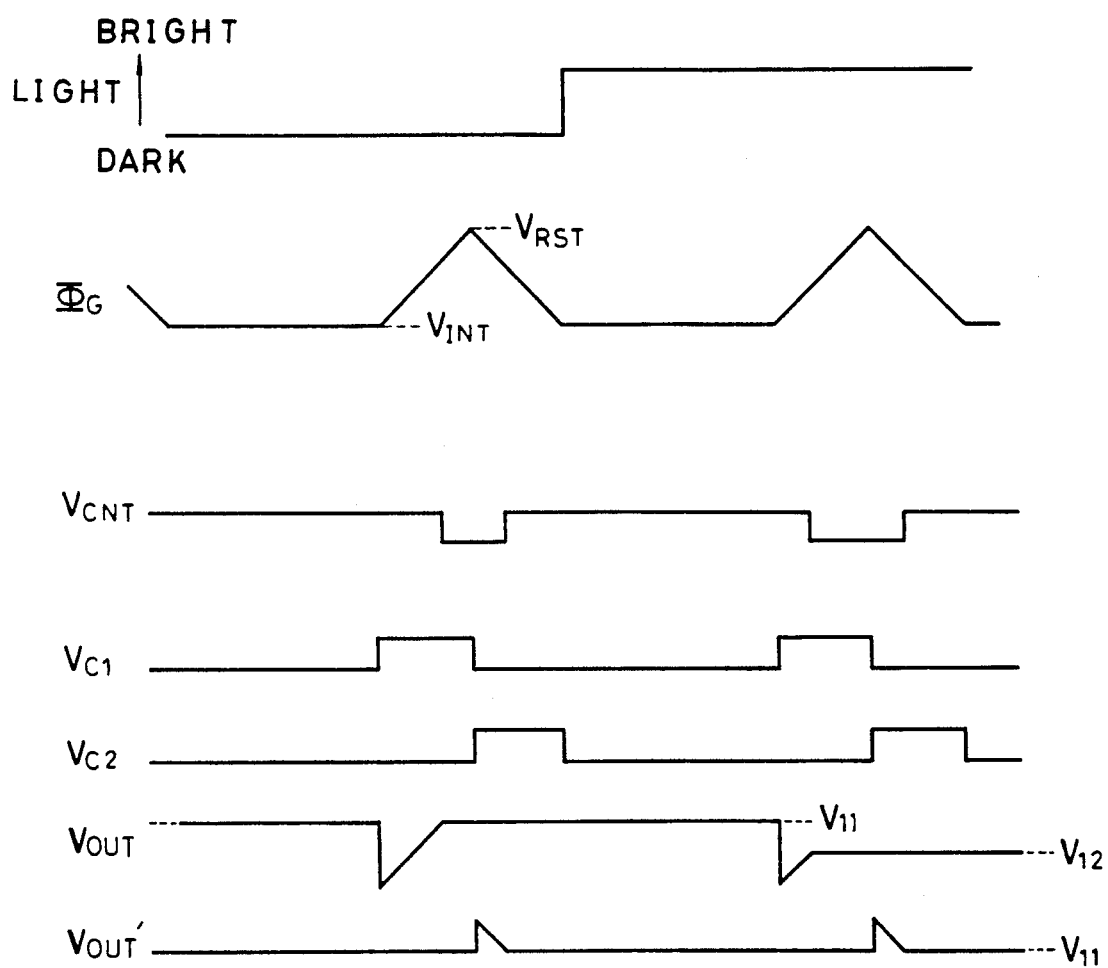
FIG. 14 is a chart of signal waveforms at various points for explaining operation of the third embodiment.

FIG. 14 is a chart of signal waveforms for explaining basic readout operation of the CMD photoelectric conversion device shown in FIG. 13. The gate control circuit 5 in FIG. 13 delivers an output pulse $\Phi_G$ in the form of a triangular wave such that the output pulse takes integrating potential $V_{INT}$ for one period and changes from the integrating potential $V_{INT}$ to reset potential $V_{RST}$ and then back to the integrating potential $V_{INT}$ for the other period, as shown in FIG. 14. The operating point detection circuit 31 is designed to change its output at a predetermined operating point in the course of transition of the CMD 1 from an on-state to an off-state. A control signal $V_{C1}$ applied to the control terminal 33 is inputted to the gate circuit 35, and acts so that the output 32 of the operating point detection circuit 31 becomes effective as an opening/closing operation control signal of the switch 37 for only a period in which the output pulse $\Phi_G$ from the gate control circuit 5 changes from the integrating potential $V_{INT}$ to the reset potential $V_{RST}$, and that the switch 37 is kept open for the remaining period regardless of the output 32 of the operating point detection circuit 31. A control signal $V_{C2}$ applied to the control terminal 34 is inputted to the gate circuit 36, and acts so that the output 32 of the operating point detection circuit 31 becomes effective as an opening/closing operation control signal of the switch 38 for only a period in which the output pulse $\Phi_G$ from the gate control circuit 5 changes from the reset potential $V_{RST}$ to the integrating potential $V_{INT}$, and that the switch 38 is kept open for the remaining period regardless of the output 32 of the operating point detection circuit 31.

On the other hand when $\Phi_G$ reaches the reset potential $V_{RST}$, holes produced by light and integrated below the gate field surface of the CMD 1 are discharged to perform reset operation. Accordingly, the potential corresponding to the predetermined operating point of the CMD in a dark state is sampled and held in the potential integrating capacitor 40 based on the potential of the gate pulse outputted in the form of a triangular wave, thereby delivering output voltage $V_{OUT}'$ from the output terminal 42. Also, the potential corresponding to the predetermined operating point of the CMD in a bright state under exposure is sampled and held in the potential integrating capacitor 39 based on the potential of the gate pulse outputted in the form of a triangular wave, thereby delivering output voltage $V_{OUT}$ from the output terminal 41.

Stated otherwise, if the gate pulse $\Phi_G$ outputted in the form of a triangular wave is applied to the gate 4 such that the CMD 1 is exposed while applying the integrating potential $V_{INT}$ to the gate 4, the operating point detection circuit 31 is operated depending on the exposure amount so far exposed, following which the operating point detection circuit 31 is operated again under a condition of the integrated electric charges being reset. Accordingly, the gate potential corresponding to the exposure amount per gate pulse is sampled and held in the potential integrating capacitor 39, whereas the gate potential corresponding to a dark state is sampled and held in the potential integrating capacitor 40. As a result, the signal voltage is given by a difference between the voltages $V_{OUT}$, $V_{OUT}'$ which appear at the output terminals 41 and 42, respectively, after completion of the period in which the gate pulse $\Phi_G$ is outputted in the form of a triangular wave while changing from the integrating potential $V_{INT}$ to the reset potential $V_{RST}$ and then back to the integrating potential $V_{INT}$.

Figure 15:
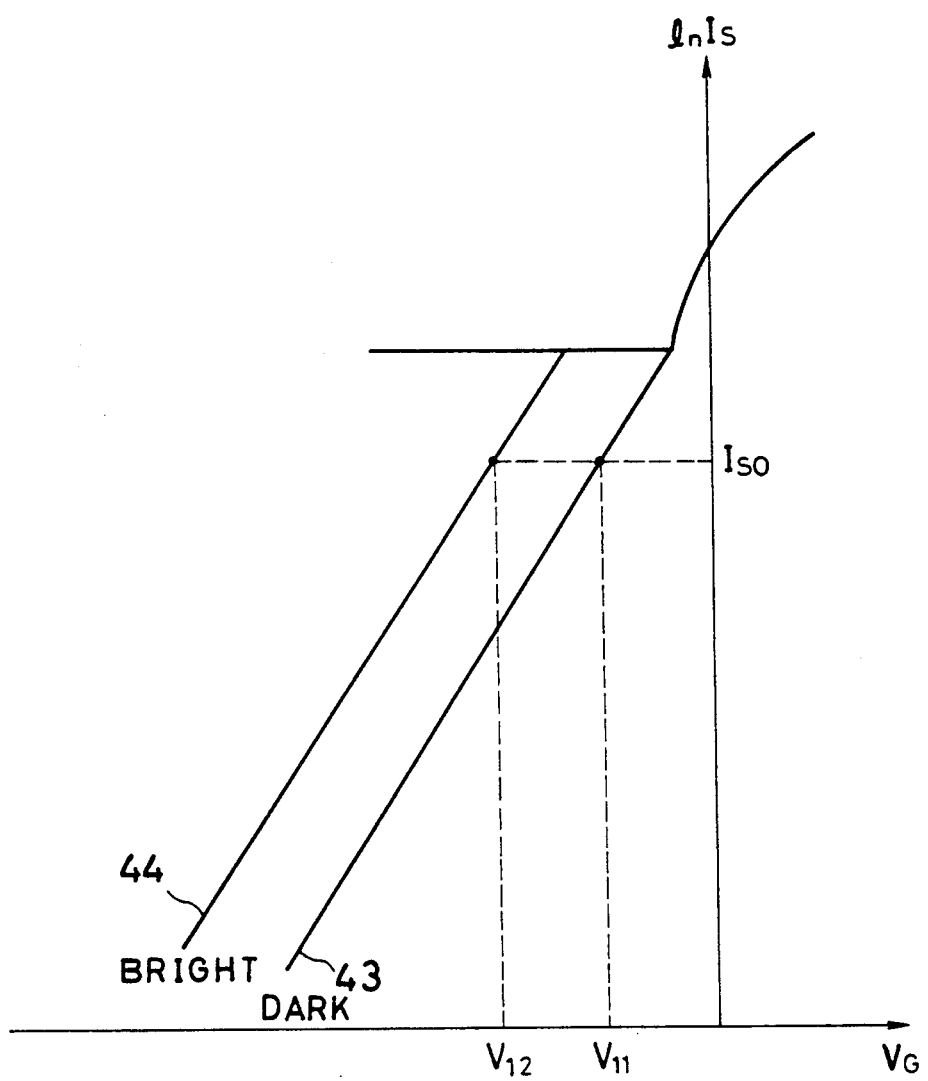
FIG. 15 is a graph showing operating characteristics of the CMD in the third embodiment.

Such a behavior is depicted in a graph of FIG. 15 showing operating characteristics of the CMD. A characteristic curve 43 corresponds to a source current characteristic when the exposure amount is zero, i.e., in a dark state, and a characteristic curve 44 corresponds to a source current characteristic in a bright state. Assuming that the decision point of the operating point detection circuit 31 is set to a position where the source current meets $I_S = I_{SO}$, the gate potential $V_{12}$ corresponding to a bright state is sampled and held in the potential integrating capacitor 39, whereas the gate potential $V_{11}$ corresponding to a dark state is sampled and held in the potential integrating capacitor 40.

Meanwhile, in FIG. 15, the characteristic curve 44 in a bright state is given by shifting the characteristic curve 43 in a dark state by $V_{12}-V_{11}$ along the axis indicative of the gate voltage. Assuming that the number of holes produced by light and integrated under the gate electrode 4 of the CMD 1 is $n_H$, the capacity of the gate insulating film of the CMD 1 is $C_{OX}$, and the elementary electric charge is q, an amount of the above shift is expressed below:

$$n_H \cdot q = C_{OX} \cdot (V_{11} - V_{12}) \tag{8}$$

$$V_{11} - V_{12} = n_H \cdot q / C_{OX} \tag{9}$$

This implies that the difference $(V_{11}-V_{12})$ between the voltages integrated in the potential integrating capacitor 39 and the potential integrating capacitor 40 is proportional to the number $n_H$ of the holes integrated.

In other words, with the readout means of this embodiment, the output signal takes a level proportional to the hole number $n_H$, the proportional constant is determined by only the capacity $C_{OX}$ of the gate insulating film of the CMD and the elementary electric charge q, and further the constant term other than the proportional term is not present, as expressed by the equation (9). Consequently, photoelectric conversion characteristics representing the relation between the exposure amount and the output signal exhibits very good linearity, and the stable output signal can be obtained regardless of temperature changes.

Next, a fourth embodiment of the present invention will be described with reference to FIG. 16. The CMD i has the gate 4 connected to the output terminal of the gate control circuit 5, and the source 3 connected to an operating point detection circuit 51 for the CMD 1. An output of the operating point detection circuit 51 controls opening and closing operations of a switch 52 which has one end connected to the gate 4 of the CMD 1, and the other end 53 connected to not only the other end of a switch 54 having one end thereof connected to a potential integrating capacitor 55 to provide an output terminal 56, but also the other end of a switch 57 having one end thereof connected to a potential integrating capacitor 58 to provide an output terminal 59. Opening and closing operations of the switch 54 is controlled by a control signal $\Phi_1$ applied to a control terminal 60 of the switch 54, whereas opening and closing operations of the switch 57 is controlled by a control signal $\Phi_2$ applied to a control terminal 61 of the switch 57.

Figure 16:
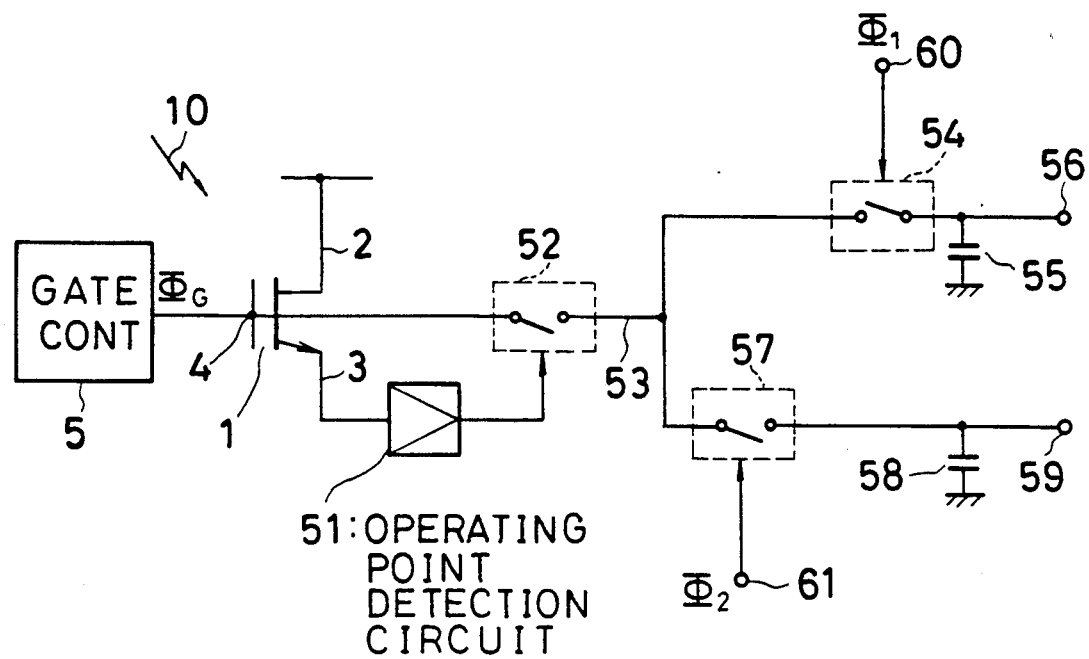
FIG. 16 is a circuit diagram showing a fourth embodiment.
Figure 17:
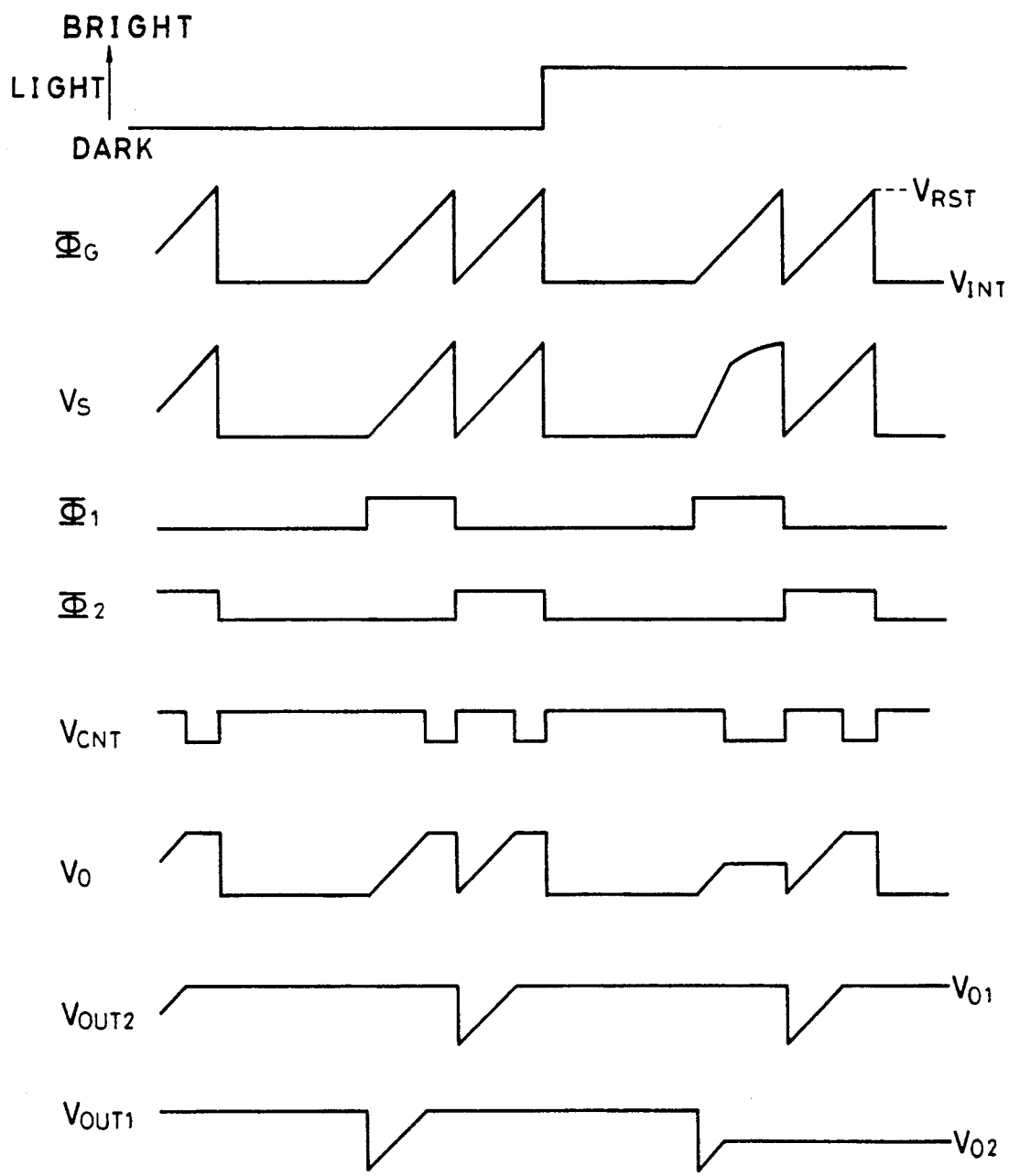
FIG. 17 is a chart of signal waveforms at various points for explaining operation of the fourth embodiment.

FIG. 17 is a chart of signal waveforms for explaining basic readout operation of the CMD photoelectric conversion device shown in FIG. 16. The gate control circuit 5 in FIG. 16 delivers an output pulse $\Phi_G$ in the form of a sawtooth wave such that the output pulse takes integrating potential $V_{INT}$ for one period, and changes to slowly ascends from the integrating potential $V_{INT}$ to reset potential $V_{RST}$ and then quickly descends back to the integrating potential $V_{INT}$ twice for the other period corresponding to two cycles, as shown in FIG. 17. The operating point detection circuit 51 is designed to change its output at a predetermined operating point in the course of transition of the CMD 1 from an on-state to an off-state. A control signal $\Phi_1$ applied to the control terminal 60 is a signal to turn on the switch 54 for only a period corresponding to the first cycle of the period in which $\Phi_G$ outputs the two sawtooth pulses, and a control signal $\Phi_2$ applied to the control terminal 61 is a signal to turn on the switch 57 for only a period corresponding to the second cycle of the period in which $\Phi_G$ outputs the two sawtooth pulses.

On the other hand, when $\Phi_G$ enters the period corresponding to the first cycle of the period in which $\Phi_G$ outputs the two sawtooth pulses, the CMD 1 transits from an off-state to an on-state so that the potential corresponding to the predetermined operating point of the CMD 1 in a bright state under exposure is sampled and held in the potential integrating capacitor 55 based on the potential of the gate pulse outputted in the form of a sawtooth wave, thereby delivering output voltage $V_{OUT1}$ from the output terminal 56. Then, when $\Phi_G$ reaches the reset potential $V_{RST}$, holes produced by light and integrated below the gate field surface of the CMD 1 are discharged to perform reset operation. Accordingly, when $\Phi_G$ enters the period corresponding to the second cycle of the period in which $\Phi_G$ outputs the two sawtooth pulses, the CMD 1 also transits from an off-state to an on-state so that the potential corresponding to the predetermined operating point of the CMD 1 in a dark state is sampled and held in the potential integrating capacitor 58 based on the potential of the gate pulse outputted in the form of a sawtooth wave, thereby delivering output voltage $V_{OUT2}$ from the output terminal 56.

Stated otherwise, the gate potential corresponding to the exposure amount per gate pulse is sampled and held in the potential integrating capacitor 55, whereas the gate potential corresponding to a dark state is sampled and held in the potential integrating capacitor 58. As a result, the signal voltage is given by a difference between voltages $V_{O1}$, $V_{O2}$ which appear at the output terminals 56 and 59, respectively, after completion of the period in which the gate pulse $\Phi_G$ generates two cycles of the sawtooth pulses while changing from the integrating potential $V_{INT}$ to the reset potential $V_{RST}$ and then back to the integrating potential $V_{INT}$ twice. Note that $V_0$ denotes potential at the other end 53 of the switch 52.

Figure 18:
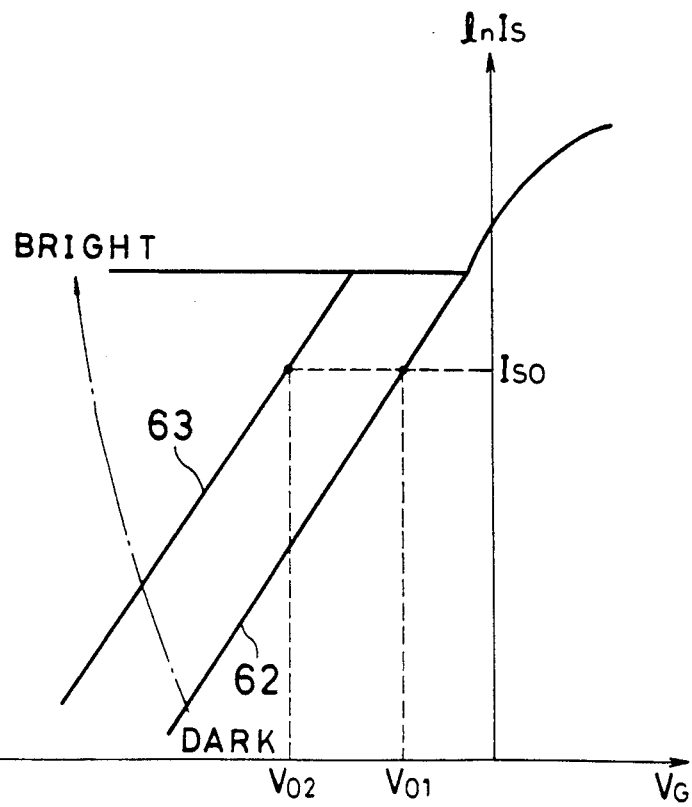
FIG. 18 is a graph showing operating characteristics of the CMD in the fourth embodiment.

Such a behavior is depicted in a graph of FIG. 18 showing operating characteristics of the CMD. A characteristic curve 62 corresponds to a source current characteristic when the exposure amount is zero, i.e., in a dark state, and a characteristic curve 63 corresponds to a source current characteristic in a bright state. Assuming that the decision point of the operating point detection circuit 51 is set to a position where the source current meets $I_S = I_{SO}$, the gate potential $V_{O2}$ corresponding to a bright state is sampled and held in the potential integrating capacitor 55, whereas the gate potential $V_{O1}$ corresponding to a dark state is sampled and held in the potential integrating capacitor 58.

Meanwhile, in FIG. 18, the characteristic curve 63 in a bright state is given by shifting the characteristic curve 62 in a dark state by $V_{O2}-V_{O1}$ along the axis indicative of the gate voltage. Assuming that the number of holes produced by light and integrated under the gate electrode 4 of the CMD is $n_H$, the capacity of the gate insulating film of the CMD is $C_{OX}$, and the elementary electric charge is q, an amount of the above shift is expressed below:

$$n_H \cdot q = C_{OX} \cdot (V_{O1} - V_{O2}) \tag{10}$$

$$V_{O1} - V_{O2} = n_H \cdot q / C_{OX} \quad (11)$$

This implies that $(V_{11} - V_{12})$ is proportional to the number $n_H$ of the holes integrated. In other words, with the readout means of this embodiment, the output signal takes a level proportional to the hole number $n_H$, the proportional constant is determined by only the capacity $C_{OX}$ of the gate insulating film of the CMD and the elementary electric charge q, and further the constant term other than the proportional term is not present, as expressed by the equation (11). Consequently, photoelectric conversion characteristics representing the relation between the exposure amount and the output signal exhibits very good linearity, and the stable output signal can be obtained regardless of temperature changes.

In addition, since the gate voltage signals corresponding to bright and dark states are sampled and held through the same switch 52, error and noise incidental to the opening and closing operations of the switch 52 evenly occur in both the signals during the bright and dark states. Therefore, by differentially calculating a difference between the signals during the bright and dark states in an external downstream stage, it is possible to minimize an influence of the error and noise incidental to the opening and closing operations of the switch 52, and to obtain the more satisfactory output signal.

Figure 19:
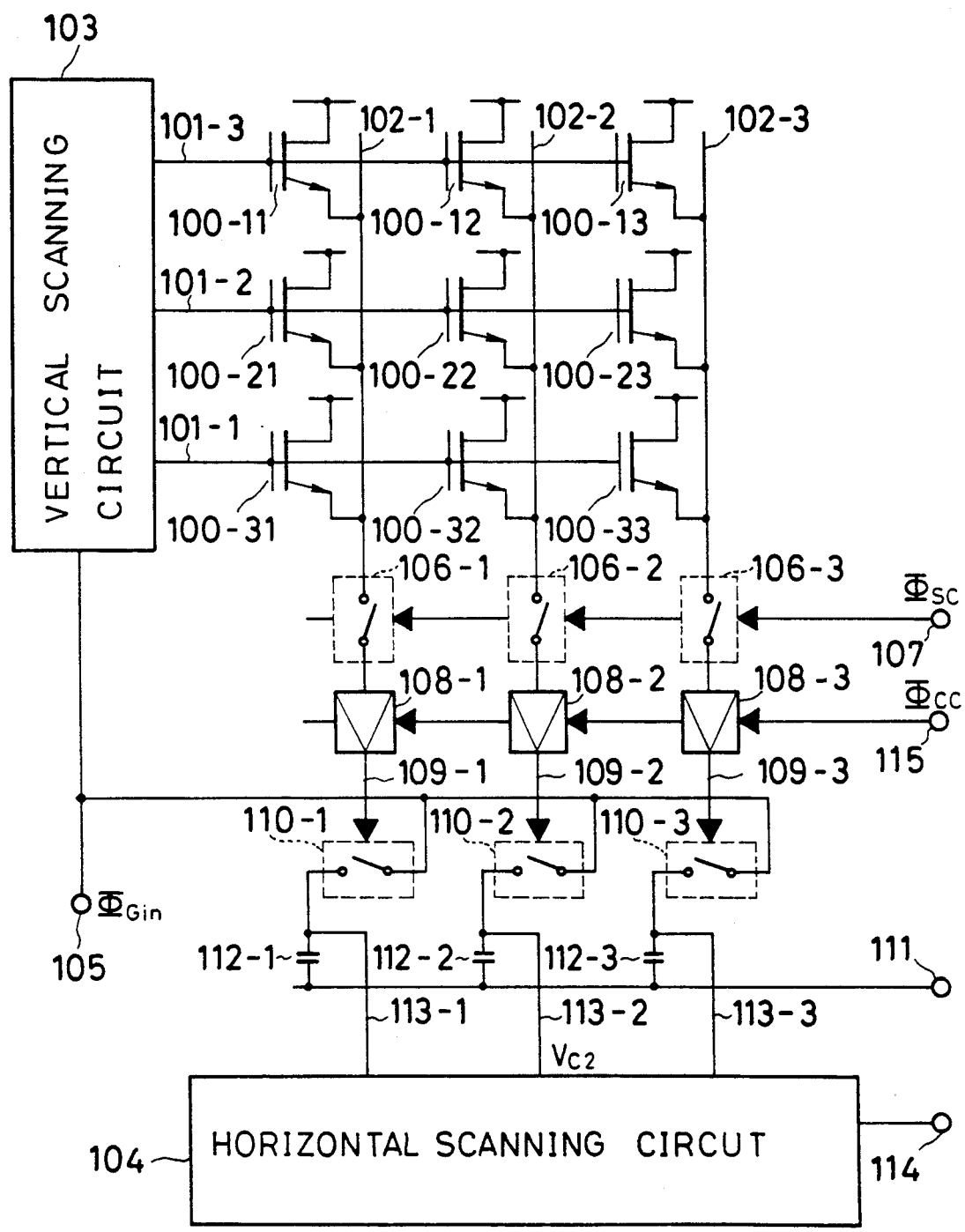
FIG. 19 is a circuit diagram showing a fifth embodiment.

Next, a fifth embodiment of the present invention will be described with reference to FIG. 19. In this embodiment, the read means of the first embodiment shown in FIG. 4 is applied to a CMD area sensor. CMDs 100-11, 100-12, . . . , 100-33 constituting respective pixels are arranged in the form of a matrix, and not-shown video voltage $V_{DD}$ (>0) is commonly applied to respective drains of the CMDs. Respective gate terminals of a group of CMDs in each row arrayed in the X-direction are commonly connected to corresponding one of row line select lines 101-1, 101-2, 101-3 outputted from a vertical scanning circuit 103. Respective source terminals of a group of CMDs in each column arrayed in the Y-direction are commonly connected to corresponding one of column lines 102-1, 102-2, 102-3 in turn respectively connected to one ends of switches 106-1, 106-2, 106-3 of which opening and closing operations are controlled by an input from a control terminal 107.

The other ends of the switches 106-1, 106-2, 106-3 are respectively connected to input terminals of operating point detection circuits 108-1, 108-2, 108-3 of which operations are controlled by an input from a control terminal 115. Output terminals 109-1, 109-2, 109-3 of the operating point detection circuits 108-1, 108-2, 108-3 are respectively connected to sample/hold switches 110-1, 110-2, 110-3 for providing control signals to control opening and closing operations thereof.

The sample/hold switches 110-1, 110-2, 110-3 have their one ends commonly connected to an input terminal 105 led to the vertical scanning circuit 103 for reading respective signals of the CMDs, and their opposite ends respectively connected to signal voltage hold capacitors 112-1, 112-2, 112-3 for holding respective gate potentials corresponding to exposure amounts of the CMDs. The signal voltages held by the signal voltage hold capacitors 112-1, 112-2, 112-3 are sequentially outputted by a horizontal scanning circuit 104 from respective joint points 113-1, 113-2, 113-3 to a signal output terminal 114.

The horizontal scanning circuit 104 can be constituted by using one equivalent to a horizontal scanning circuit for sequentially reading signal voltages stored in signal voltage hold capacitors per column line, which circuit is used in an FGA image sensor disclosed in IEEE TRANSACTIONS ON ELECTRON DEVICES, VOL. 35, NO. 5, MAY 1988, pp. 646-652 and Japanese Patent Laid-Open No. 64-14959, a BASIS image sensor disclosed in Technical Report of Electron Communication Society of Japan, ICD 89-122, pp. 79-86 (Sep., 1988), as well as an SIT image sensor disclosed in Technical Report of Television Society of Japan, Vol. 11, No. 28, pp. 43-47, 87-81 ID'87-104 (Nov., 1987). Therefore, operation of the horizontal scanning circuit 104 will not be described here in detail. The other ends of the signal voltage hold capacitors 112-1, 112-2, 112-3 are commonly connected to a common bias terminal 111 to which reference voltage is applied externally.

Figure 20:
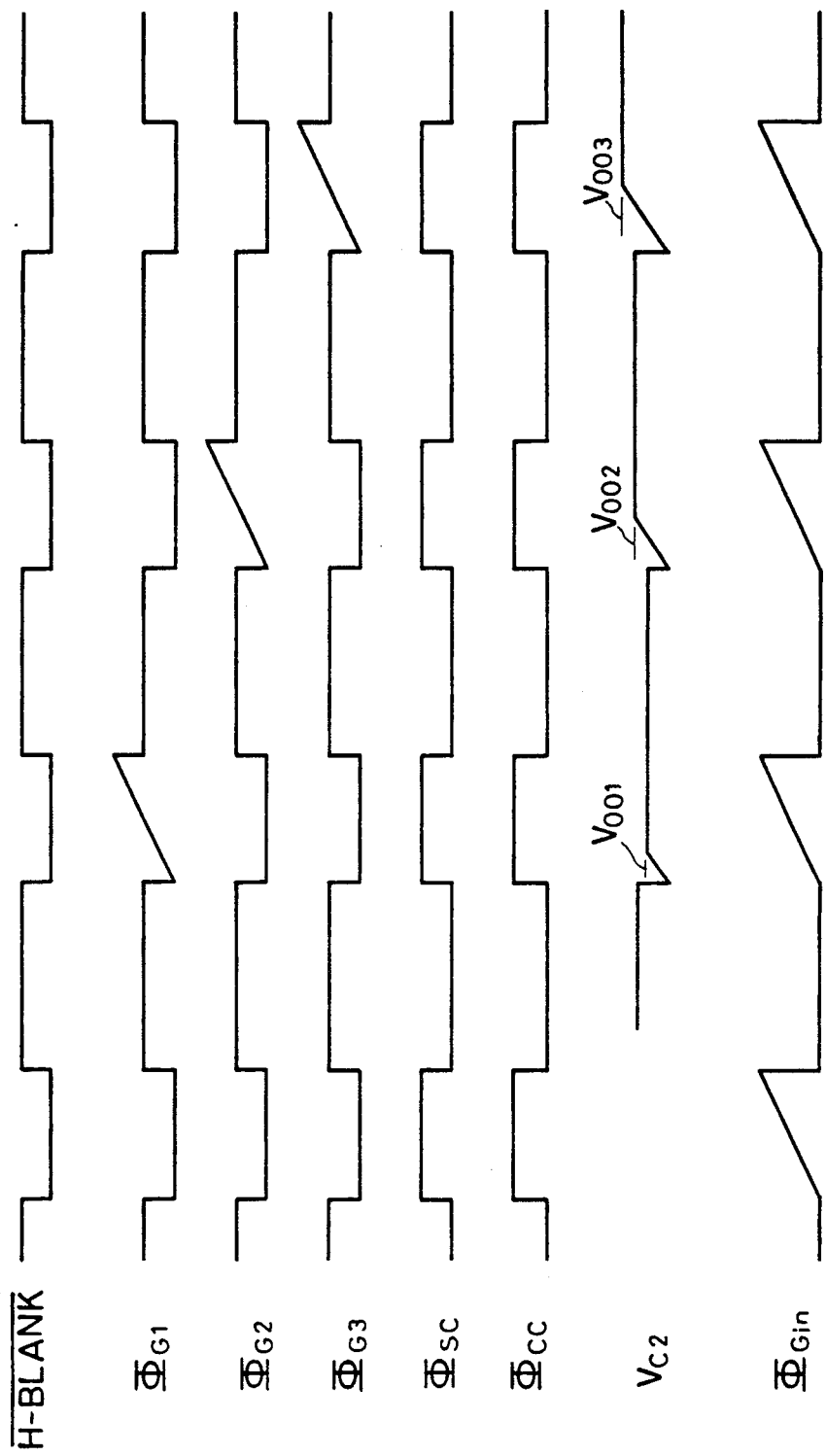
FIG. 20 is a chart of signal waveforms at various points for explaining operation of the fifth embodiment.

Operation of this embodiment will be explained below with reference to FIG. 20 showing a chart of signal waveforms at various points. H-BLANK is a signal indicating the timing of a horizontal blanking period of a video signal. A low-voltage portion of this signal corresponds to the horizontal blanking period. $\Phi_{Gin}$ stands for a bias applied to the terminal 105 in FIG. 19. This bias is applied to selected one of the row line select lines only during the horizontal blanking period, and also to one ends of the sample/hold switches 110-1, 110-2, 110-3 commonly connected to each other. During each horizontal blanking period, the vertical scanning circuit 103 outputs the bias applied to the terminal 105 in FIG. 19 to the selected row line select line, and also potential of deeply negative level to the non-selected row line select lines so that the CMDs connected to those lines are turned off to prevent source currents from flowing through the CMDs. The above process is represented by $\Phi_{G1}, \Phi_{G2}, \Phi_{G3}$.

Other than the horizontal blanking period, i.e., during an effective period of the video signal, since the horizontal scanning circuit 104 and the signal voltage hold section per column line are disconnected from the pixel array section made up by the CMDs by operations of the switches 106-1, 106-2, 106-3 as described later, potential of each row line select line may be at any level of voltage so long as a biased state is generated enough to integrate holes photo-produced below respective gate field surfaces of the CMDs serving as the pixels.

On the other hand, the opening and closing operations of the switches 106-1, 106-2, 106-3, to which the respective column lines of the CMDs are connected, are controlled by an input signal $\Phi_{SC}$ from the control terminal 107 such that the switches are closed only during the horizontal blanking period of the video signal and opened in the remaining period. The operating point detection circuits 108-1, 108-2, 108-3 are controlled by an input signal $\Phi_{CC}$ from the control terminal 115 such that they serve as operating point detection circuits only during a period in which $\Phi_{CC}$ is at a high level, and generate control signals to keep the sample/hold switches 110-1, 110-2, 110-3 in a held state regardless of any input during a period in which $\Phi_{CC}$ is at a low level.

Consider now the signal voltage hold capacitor 112-2, by way of example. During the first video signal blanking period, since the CMDs other than those connected to the row line select line 101-1 are not selected, the gate voltage $V_{OO1}$ corresponding to an exposure amount of the CMD 100-32 is held by the signal voltage hold capacitor 112-2, so that the joint point 113-2 between the capacitor 112-2 and the horizontal scanning circuit 104 takes potential $V_{C2}$. Upon the horizontal scanning circuit 104 being operated within a subsequent effective period of a video signal, the potential corresponding to the voltage held by the signal voltage hold capacitor 112-2 is delivered to the signal output terminal 114 at the predetermined timing.

Then, during the second video signal blanking period, since the ones other than the row line select line 101-2 are not selected, the gate voltage $V_{0O2}$ corresponding to an exposure amount of the CMD 100-22 is held by the signal voltage hold capacitor 112-2 and delivered to the signal output terminal 114 at the predetermined timing upon the horizontal scanning circuit 104 being operated within an effective period of a subsequent video signal. Thereafter, the process of holding the gate voltage corresponding to an exposure amount of the CMD, of which source terminal is connected to the column line 102-2, in the signal voltage hold capacitor 112-2 and delivering that gate voltage to the signal output terminal 114 at the predetermined timing upon the horizontal scanning circuit 104 being operated within an effective period of a subsequent video signal will be successively repeated in a like manner.

With this embodiment, on the same grounds as those stated in connection with the first embodiment, photoelectric conversion characteristics representing the relation between the exposure amount and the output signal exhibits very good linearity, and the output signal is less affected by temperature characteristics of the CMD, thereby permitting the present area image sensor to provide a more satisfactory signal than the prior art.

Figure 21:
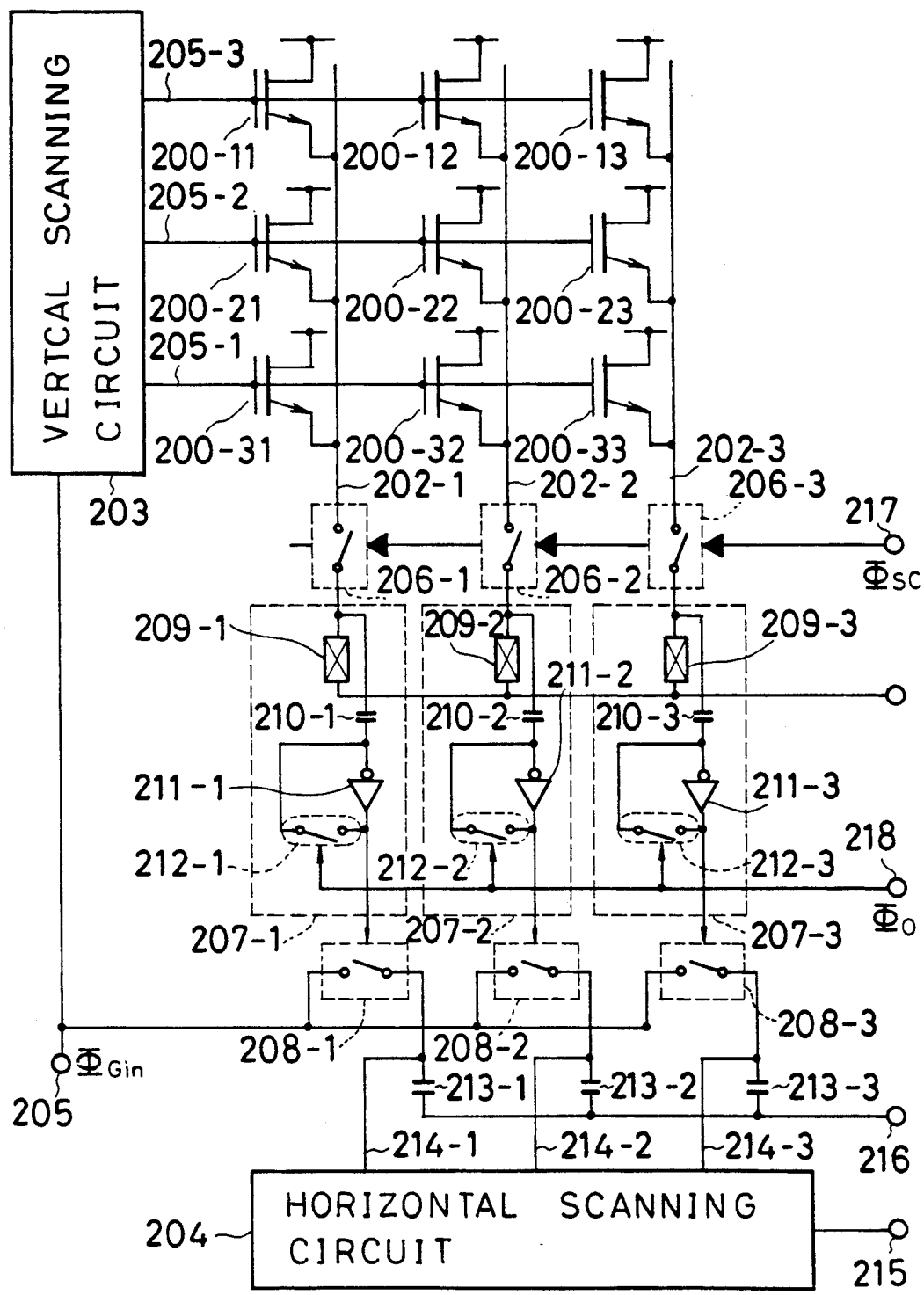
FIG. 21 is a circuit diagram showing a sixth embodiment.

FIG. 21 is a circuit diagram for explaining the configuration of a sixth embodiment of the present invention. In this embodiment, the read means of the second embodiment shown in FIG. 10 is applied to a CMD area sensor. CMDs 200-11, 200-12, ..., 200-33 constituting respective pixels are arranged in the form of a matrix, and not-shown video voltage $V_{DD}$ (>0) is commonly applied to respective drains of the CMDs. Respective gate terminals of a group of CMDs in each row arrayed in the X-direction are commonly connected to corresponding one of row line select lines 205-1, 205-2, 205-3 connected to a vertical scanning circuit 203. Respective source terminals of a group of CMDs in each column arrayed in the Y-direction are commonly connected to corresponding one of column lines 202-1, 202-2, 202-3 in turn respectively connected to one ends of switches 206-1, 206-2, 206-3 of which opening and closing operations are controlled by an input signal $\Phi_{SC}$ from a control terminal 217. The other ends of the switches 206-1, 206-2, 206-3 are respectively connected to input terminals of operating point detection circuits 207-1, 207-2, 207-3 which have output terminals respectively connected to sample/hold switches 208-1, 208-2, 208-3 for providing control signals to control opening and closing operations thereof.

In the operating point detection circuit 207-1, a load 209-1 for detecting a current flowing through the column line 202-1 and one end of a capacitor 210-1 for AC coupling are both connected to a switch 206-1. The other end of the AC coupling capacitor 210-1 is connected to an input terminal of an inverter 211-1 operating as a voltage comparator, and also to an auto-zero switch 212-1 connected to both ends of the inverter 211-1 for setting an input terminal of the inverter 211-1 to a decision point for the voltage comparator. The operating point detection circuits 207-2 and 207-3 have the same arrangement as that of the operating point detection circuit 207-1 and will not be thus explained here.

The sample/hold switches 208-1, 208-2, 208-3 have their one ends commonly connected to an input terminal 205 of the vertical scanning circuit 203 for reading respective signals of the CMDs, and their opposite ends respectively connected to signal voltage hold capacitors 213-1, 213-2, 213-3 for holding respective gate potentials corresponding to exposure amounts of the CMDs. The signal voltages held by the signal voltage hold capacitors 213-1, 213-2, 213-3 are sequentially outputted by a horizontal scanning circuit 215 from respective joint points 214-1, 214-2, 214-3 to a signal output terminal 215.

The horizontal scanning circuit 204 can be constituted by using one equivalent to a horizontal scanning circuit for sequentially reading, per column line, differential voltages between signal voltages stored in signal charge hold capacitors and noise-equivalent voltages stored in noise information hold capacitors provided to hold noise information separately from the signal charge hold capacitors, or a horizontal scanning circuit for sequentially reading both the above voltages in parallel, which circuit is used in an FGA image sensor disclosed in IEEE TRANSACTIONS ON ELECTRON DEVICES, VOL. 35, NO. 5, MAY 1988, pp. 646–652 and Japanese Patent Laid-Open No. 64-14959, as well as a BASIS image sensor disclosed in Technical Report of Electron Communication Society of Japan, ICD 89-122, pp. 79–86 (Sep., 1988). Therefore, operation of the horizontal scanning circuit 204 will not be described here in detail. The other ends of the signal voltage hold capacitors 213-1, 213-2, 213-3 are commonly connected to a common bias terminal 216 to which reference voltage is applied externally.

Figure 22:
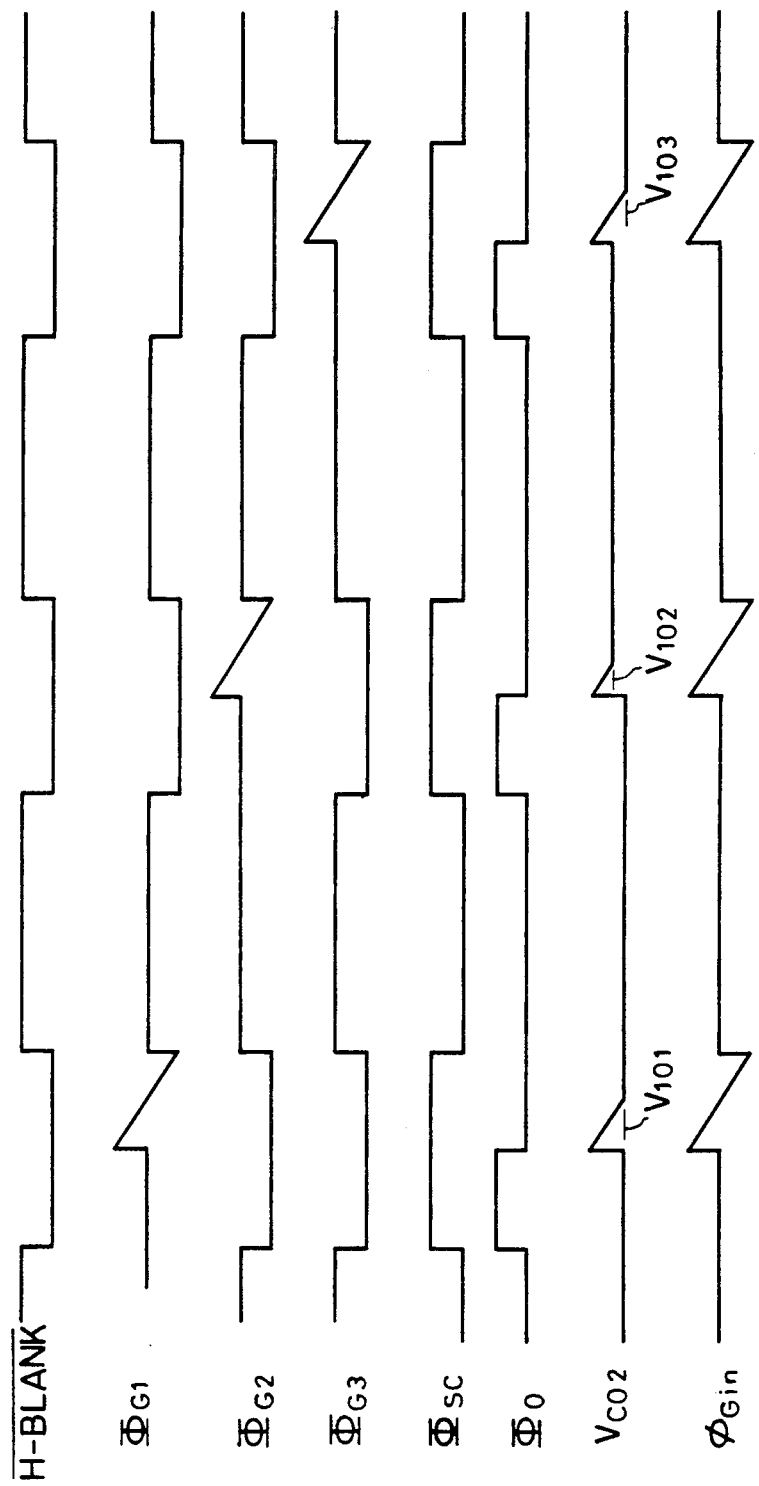
FIG. 22 is a chart of signal waveforms at various points for explaining operation of the sixth embodiment.

Operation of this embodiment will be explained below with reference to FIG. 22 showing a chart of signal waveforms at various points. H-BLANK is a signal indicating the timing of a horizontal blanking period of a video signal. A low-voltage portion of this signal corresponds to the horizontal blanking period. $\Phi_{Gin}$ stands for a bias applied to the terminal 205 in FIG. 21. This bias is applied to selected one of the row line select lines only during the horizontal blanking period, and also to one ends of the sample/hold switches 208-1, 208-2, 208-3 commonly connected to each other. During each horizontal blanking period, the vertical scanning circuit 203 outputs the bias applied to the terminal 205 in FIG. 21 to the selected row line select line, and also potential of deeply negative level to the non-selected row line select lines so that the CMDs connected to those lines are turned off to prevent source currents from flowing through the CMDs. The above process is represented by $\Phi_{G1}$, $\Phi_{G2}$, $\Phi_{G3}$.

Other than the horizontal blanking period, i.e., during an effective period of the video signal, since the horizontal scanning circuit 204 and the signal voltage hold section per column line are disconnected from the pixel array section made up by the CMDs by operations of the switches 206-1, 206-2, 206-3 as described later, potential of each row line select line may be at any level of voltage so long as a biased state is generated enough to integrate holes photo-produced below respective gate field surfaces of the CMDs serving as the pixels.

On the other hand, the opening and closing operations of the switches 206-1, 206-2, 206-3, to which the respective column lines of the CMDs are connected, are controlled by an input signal $\Phi_{SC}$ from the control terminal 217 such that the switches are closed only during the horizontal blanking period of the video signal and opened in the remaining period. When the pulse outputted from the vertical scanning circuit 203 reaches read potential $V_2$, the source current of the CMD 200-32 is changed depending on the exposure amount so far exposed, and its current value leads to a potential change through the load 209. At this time, the auto-zero switch 212-2 is turned on by a control signal $\Phi_O$ inputted from the control terminal 218 for setting the input terminal of the inverter 211-2, which operates as a voltage comparator, to the decision voltage. Therefore, differential voltage between the potential corresponding to the source current, which flows depending on an exposed state of the CMD 200-32, and the decision voltage is applied across the AC-coupling capacitor 210-2 to be charged therein. Then, after the auto-zero switch 212-2 is turned off by the control signal $\Phi_O$ inputted from the control terminal 218, the operating point detection circuit 207-2 detects an operating point determined by the source current depending on the exposed state.

On the other hand, when $\Phi_G$ reaches reset potential $V_{RST}$, holes produced by light and integrated below the gate field surface of the CMD 200-32 are discharged to perform reset operation. Then, as $\Phi_G$ lowers from the reset potential $V_{RST}$, the CMD now under a dark state starts transition from an on-state to an off-state. When the operating point previously set by operation of the auto-zero switch 212-2 is reached, the output of the operating point detection circuit 207-2 is inverted. As a result, the potential $V_{101}$ corresponding to the predetermined operating point of the CMD in a dark state is sampled and held, as indicated by potential $V_{CO2}$ in FIG. 22, in the signal voltage hold capacitor 213-2 based on the potential of the gate pulse outputted. Upon the horizontal scanning circuit 204 being operated within a subsequent effective period of a video signal, the potential $V_{101}$ is delivered to the signal output terminal 215 at the predetermined timing.

Then, during the second video signal blanking period, since the ones other than the row line select line 205-2 are not selected, the gate voltage $V_{102}$ corresponding to an exposure amount of the CMD 200-22 is held by the signal voltage hold capacitor 213-2 and delivered to the signal output terminal 215 at the predetermined timing upon the horizontal scanning circuit 204 being operated within an effective period of a subsequent video signal. Thereafter, the process of holding the gate voltage corresponding to an exposure amount of the CMD, of which source terminal is connected to the column line 202-2, in the signal voltage hold capacitor 213-2 and delivering that gate voltage to the signal output terminal 215 at the predetermined timing upon the horizontal scanning circuit 204 being operated within an effective period of a subsequent video signal will be successively repeated in a like manner.

With this embodiment, on the same grounds as those stated in connection with the first embodiment, photoelectric conversion characteristics representing the relation between the exposure amount and the output signal exhibits very good linearity, and the output signal is less affected by temperature characteristics of the CMD, thereby permitting the present area image sensor to provide a more satisfactory signal than the prior art. Further, since the output signal is obtained by utilizing the fact that a gate voltage - source current characteristic of the CMD constituting each pixel is shifted by an amount of the gate voltage depending on the exposure amount, and taking out a signal representing only the shift voltage based on the difference between the output characteristics in bright and dark states, it is possible to provide a highly homogeneous video signal which will not be affected by variations in the characteristics of the CMDs constituting the respective pixels.

Figure 23:
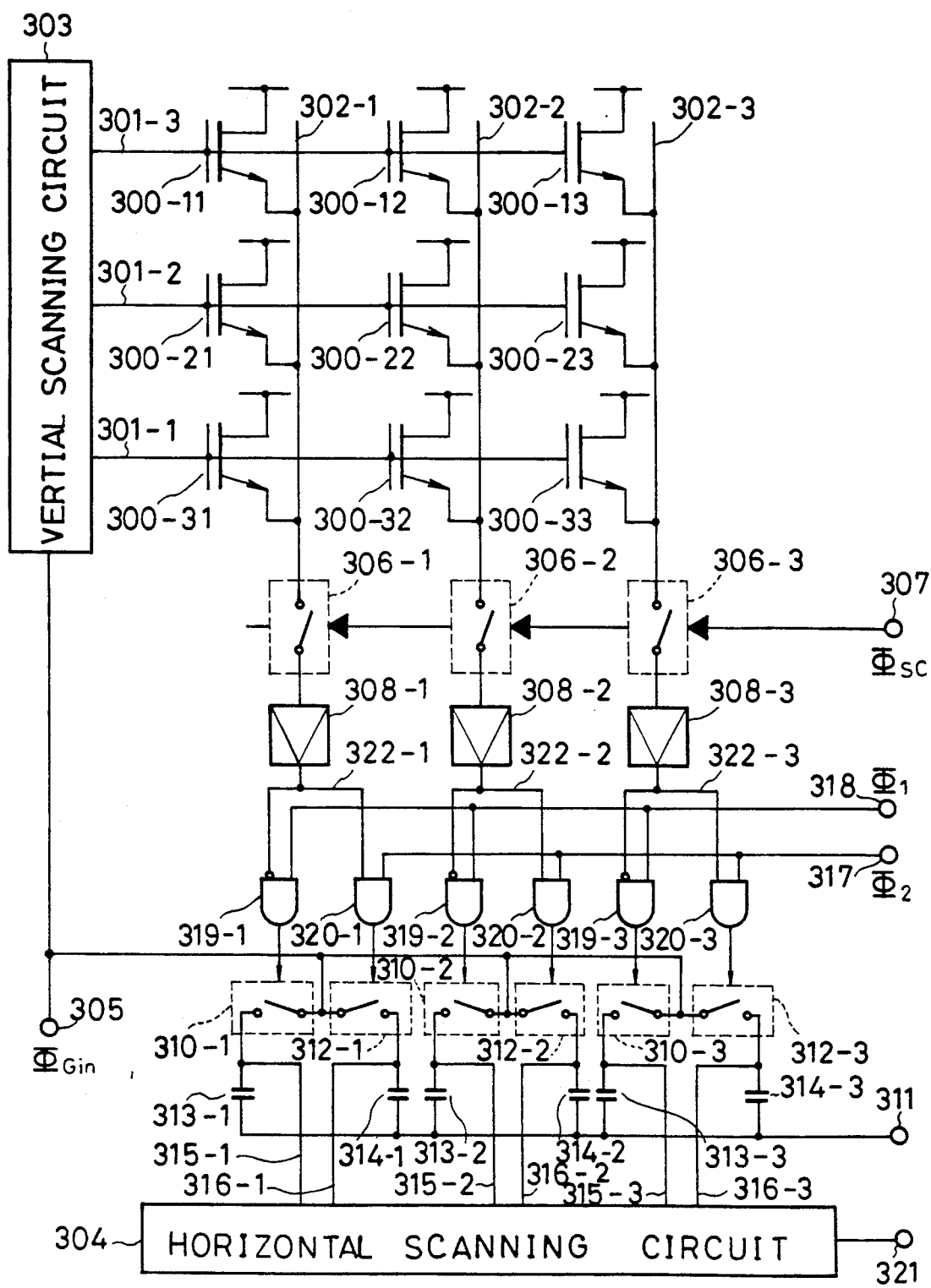
FIG. 23 is a circuit diagram showing a seventh embodiment.

FIG. 23 is a circuit diagram for explaining the configuration of a seventh embodiment of the present invention. In this embodiment, the readout means of the third embodiment shown in FIG. 13 is applied to a CMD area sensor. CMDs 300-11, 300-12, ..., 300-33 constituting respective pixels are arranged in the form of a matrix, and not-shown video voltage $V_{DD}$ (>0) is commonly applied to respective drains of the CMDs. Respective gate terminals of a group of CMDs in each row arrayed in the X-direction are commonly connected to corresponding one of row line select lines 301-1, 301-2, 301-3 connected to a vertical scanning circuit 303. Respective source terminals of a group of CMDs in each column arrayed in the Y-direction are commonly connected to corresponding one of column lines 302-1, 302-2, 302-3 in turn respectively connected to one ends of switches 306-1, 306-2, 306-3 of which opening and closing operations are controlled by an input from a control terminal 307.

The other ends of the switches 306-1, 306-2, 306-3 are respectively connected to input terminals of operating point detection circuits 308-1, 308-2, 308-3. An output terminal 322-1 of the operating point detection circuit 308-1 is connected to a gate circuit 319-1 of which inputs are given from a control terminal 318 and the output terminal 322-1, and also to a gate circuit 320-1 of which inputs are given from a control terminal 317 and the output terminal 322-1. Outputs of the gate circuits 319-1 and 320-1 are respectively applied to sample/hold switches 310-1 and 312-2 for providing control signals to control opening and closing operations thereof. Operating point detection circuits 308-2, 308-3 and their output terminals 322-2, 322-3, the control terminal 318, gate circuits 319-2, 319-3, the control terminal 317, gate controls 320-2, 320-3, and the sample/hold switches 310-2, 310-3; 312-2, 312-3 are interconnected in a like manner to the above and their circuit arrangements will not be thus explained here.

Commonly connected one ends of the sample/hold switches 310-1, 310-2, 310-3; 312-1, 312-2, 312-3 in pair are commonly connected to an input terminal 305 in turn connected to the vertical scanning circuit 303 for reading respective signals of the CMDs, whereas the sample/hold switches 310-1, 310-2, 310-3 have their opposite ends respectively connected to signal voltage hold capacitors 313-1, 313-2, 313-3 for holding respective gate potentials corresponding to exposure amounts of the CMDs. Also, the sample/hold switches 312-1, 312-2, 312-3 have their opposite ends respectively connected to signal voltage hold capacitors 314-1, 314-2, 314-3 for holding respective gate potentials corresponding to exposure amounts of the CMDs. The signal voltages held by the signal voltage hold capacitors 313-1, 313-2, 313-3 and 314-1, 314-2, 314-3 are sequentially outputted by a horizontal scanning circuit 304 from respective joint points 315-1, 315-2, 315-3; 316-1, 316-2, 316-3 to a signal output terminal 321.

The horizontal scanning circuit 304 can be constituted by using one equivalent to a horizontal scanning circuit for sequentially reading, per column line, differential voltages between signal voltages stored in signal charge hold capacitors and noise-equivalent voltages stored in noise information bold capacitors provided to hold noise information separately from the signal charge hold capacitors, or a horizontal scanning circuit for sequentially reading both the above voltages in parallel, which circuit is used in an FGA image sensor disclosed in IEEE TRANSACTIONS ON ELECTRON DEVICES, VOL. 35, NO. 5, MAY 1988, pp. 646-652 and Japanese Patent Laid-Open No. 64-14959, as well as a BASIS image sensor disclosed in Technical Report of Electron Communication Society of Japan, ICD 89-122, pp. 79–86 (Sep., 1988). Therefore, operation of the horizontal scanning circuit 304 will not be described here in detail. The other ends of the signal voltage hold capacitors 313-1, 313-2, 313-3 and 314-1, 314-2, 314-3 are commonly connected to a common bias terminal 311 to which reference voltage is applied externally.

Figure 24:
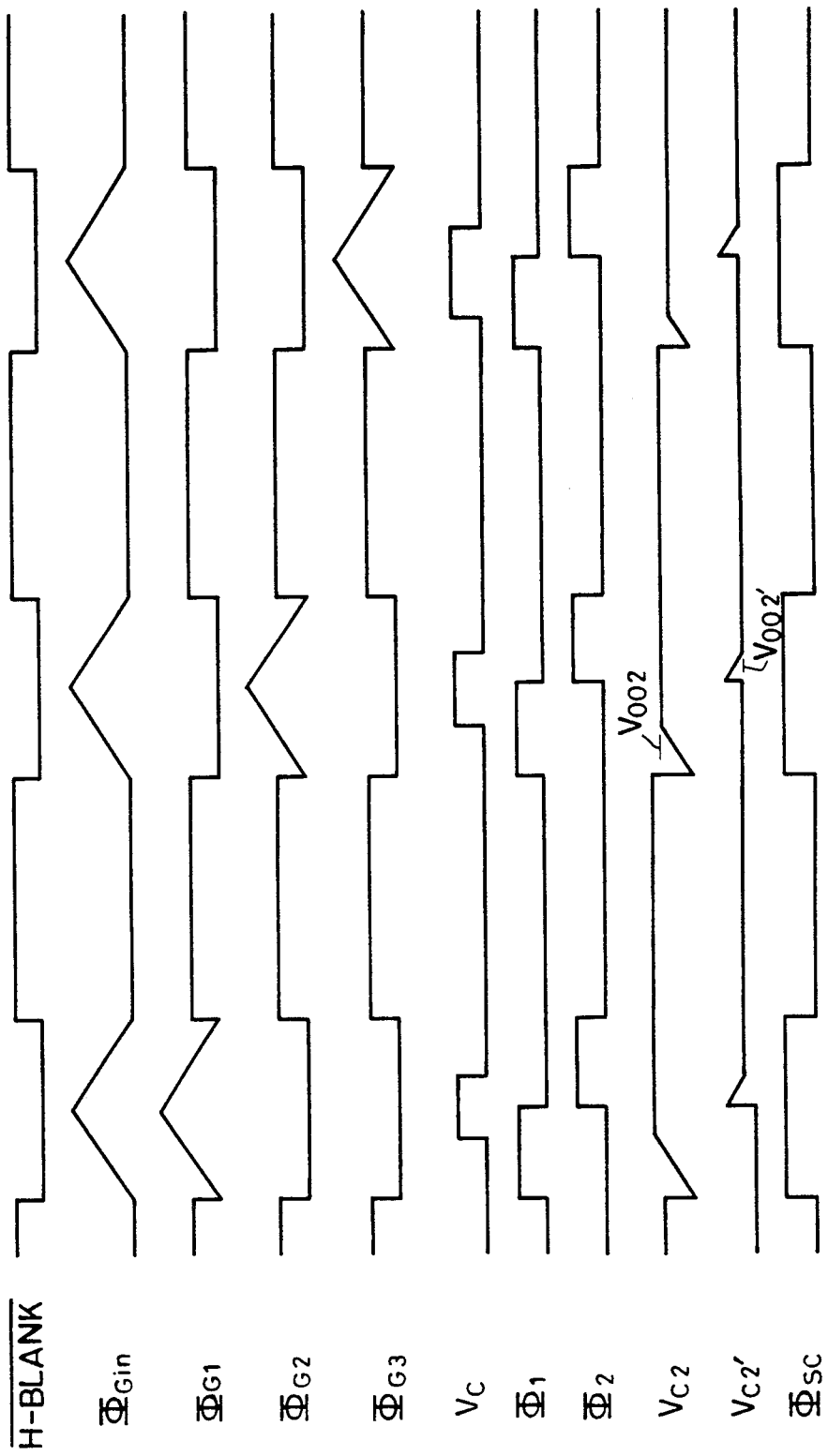
FIG. 24 is a chart of signal waveforms at various points for explaining operation of the seventh embodiment.

Operation of this embodiment will be explained below with reference to FIG. 24 showing a chart of signal waveforms at various points. H-BLANK is a signal indicating the timing of a horizontal blanking period of a video signal. A low voltage portion of this signal corresponds to the horizontal blanking period. $\Phi_{Gin}$ stands for a bias applied to the terminal 305 in FIG. 23. This bias is applied to selected one of the row line select lines only during the horizontal blanking period, and also to one ends of the sample/hold switches 310-1, 310-2, 310-3; 312-1, 312-2, 312-3. During each horizontal blanking period, the vertical scanning circuit 303 outputs the bias applied to the terminal 305 in FIG. 23 to the selected row line select line, and also potential of deeply negative level to the non-selected row line select lines so that the CMDs connected to those lines are turned off to prevent source currents from flowing through the CMDs. The above process is represented by $\Phi_{G1}$, $\Phi_{G2}$, $\Phi_{G3}$.

Other than the horizontal blanking period, i.e., during an effective period of the video signal, since the horizontal scanning circuit 304 and the signal voltage hold section per column line are disconnected from the pixel array section made up by the CMDs by operations of the switches 306-1, 306-2, 306-3 as described later, potential of each row line select line may be at any level of voltage so long as a biased state is generated enough to integrate holes photo-produced below respective gate field surfaces of the CMDs serving as the pixels. On the other hand, the opening and closing operations of the switches 306-1, 306-2, 306-3, to which the column lines 302-1, 302-2, 302-3 connected to the respective sources of the CMDs are connected, are controlled by an input signal $\Phi_{SC}$ from the control terminal 307 such that the switches are closed only during the horizontal blanking period of the video signal and opened in the remaining period.

Consider now the CMDs 300-12, 300-22, 300-32 having their source terminals connected to one end of the switch 306-2, by way of example. During the first video signal blanking period, the CMDs other than those connected to the row line select line 301-1 are not selected. Applied to the gate terminal of the CMD 300-32 is potential having a sawtooth (triangular) shape that changes from integrating potential $V_{INT}$ to reset potential $V_{RST}$ and then back to the integrating potential $V_{INT}$. The operating point detection circuit 308-2 is designed to change its output at a predetermined operating point in the course of transition of the CMD 300-32 from an off-state to an on-state.

A control signal $\Phi_1$ applied to the control terminal 318 is inputted to the gate circuit 319-2, and acts so that an output from the output terminal 322-2 of the operating point detection circuit 308-2 becomes effective as an opening/closing operation control signal of the switch 310-2 for only a period in which the pulse $\Phi_{Gin}$ applied to the input terminal 305 of the vertical scanning circuit 303 changes from the integrating potential $V_{INT}$ to the reset potential $V_{RST}$, and that the switch 310-2 is kept open for the remaining period regardless of the output from the output terminal 322-2 of the operating point detection circuit 308-2.

A control signal $\Phi_2$ applied to the control terminal 317 is inputted to the gale circuit 320-2, and acts so that an output from the output terminal 322-2 of the operating point detection circuit 308-2 becomes effective as an opening/closing operation control signal of the switch 312-2 for only a period in which the pulse $\Phi_{Gin}$ applied to the input terminal 305 of the vertical scanning circuit 305 changes from the reset potential $V_{RST}$ to the integrating potential $V_{INT}$, and that the switch 312-2 is kept open for the remaining period regardless of the output from the output terminal 322-2 of the operating point detection circuit 308-2.

On the other hand, when $\Phi_{G1}$ reaches the reset potential $V_{RST}$, holes produced by light and integrated below the gate field surface of the CMD are discharged to perform reset operation. Accordingly, the potential corresponding to the predetermined operating point of the CMD in a dark state is sampled and held in the signal voltage hold capacitor 314-2 based on the potential of the gate pulse outputted in the form of a sawtooth (triangular) wave. Also, the potential corresponding to the predetermined operating point of the CMD in a bright state under exposure is sampled and held in the potential integrating capacitor 313-2 based on the potential of the gate pulse outputted in the form of a sawtooth wave. Stated otherwise, if the gate pulse outputted in the form of a sawtooth wave is applied to the gate, the exposed CMD causes the operating point detection circuit 308-2 to be operated depending on the exposure amount so far exposed, following which the operating point detection circuit 308-2 is operated again under a condition of the integrated electric charges being reset. A potential change at the output terminal 322-2 of the operating point detection circuit 308-2 is indicated by $V_C$ in FIG. 24.

Accordingly, the gate potential corresponding to the exposure amount per gate pulse is sampled and held in the signal voltage hold capacitor 313-2, whereas the gate potential corresponding to a dark state is sampled and held in the signal voltage hold capacitor 314-2. Potential changes at the joint points 315-2, 316-2 of the signal voltage hold capacitors 313-2, 314-2 are respectively indicated by $V_{C2}$, $V_{C2}'$ in FIG. 24. As a result, the signal voltage is given by a difference between the voltages which appear at the signal voltage hold capacitors 313-2 and 314-2 after completion of the period in which the pulse $\Phi_{Gin}$ is outputted in the form of a sawtooth wave while changing from the integrating potential $V_{INT}$ to the reset potential $V_{RST}$ and then back to the integrating potential $V_{INT}$. Upon the horizontal scanning circuit 304 being operated within an effective period of a video signal subsequent to the blanking period by which the above operation is carried out, the voltage corresponding to the above differential signal is delivered to the signal output terminal 321 at the predetermined timing.

Then, during the second video signal blanking period, since the ones other than the row line select line 301-2 are not selected, the gate voltage $V_{O O2}$ corresponding to an exposure amount of the CMD 300-22 is held by the signal voltage hold capacitor 313-2, and the gate voltage $V_{O O2}'$ corresponding to a dark state is held by the signal voltage hold capacitor 314-2. Upon the horizontal scanning circuit 304 being operated within an effective period of a subsequent video signal, the voltage corresponding to the above differential signal is delivered to the signal output terminal 321 at the predetermined timing.

Thereafter, the process of holding the gate voltage corresponding to an exposure amount of the CMD, of which source terminal is connected to the column line 302-2, in the signal voltage hold capacitor 313-2, holding the gate voltage corresponding to a dark state in the signal voltage hold capacitor 314-2, and delivering those gate voltages to the signal output terminal 321 at the predetermined timing upon the horizontal scanning circuit 304 being operated within an effective period of a subsequent video signal will be successively repeated in a like manner.

With this embodiment, on the same grounds as those stated in connection with the first embodiment, photoelectric conversion characteristics representing the relation between the exposure amount and the output signal exhibits very good linearity, and the output signal is less affected by temperature characteristics of the CMD, thereby permitting the present area image sensor to provide a more satisfactory signal than the prior art. Further, since the output signal is obtained by utilizing the fact that a gate voltage - source current characteristic of the CMD constituting each pixel is shifted by an amount of the gate voltage depending on the exposure amount, and taking out a signal representing only the shift voltage based on the difference between the output characteristics in bright and dark states, it is possible to provide a highly homogeneous video signal which will not be affected by variations in the characteristics of the CMDs constituting the respective pixels.

Figure 25:
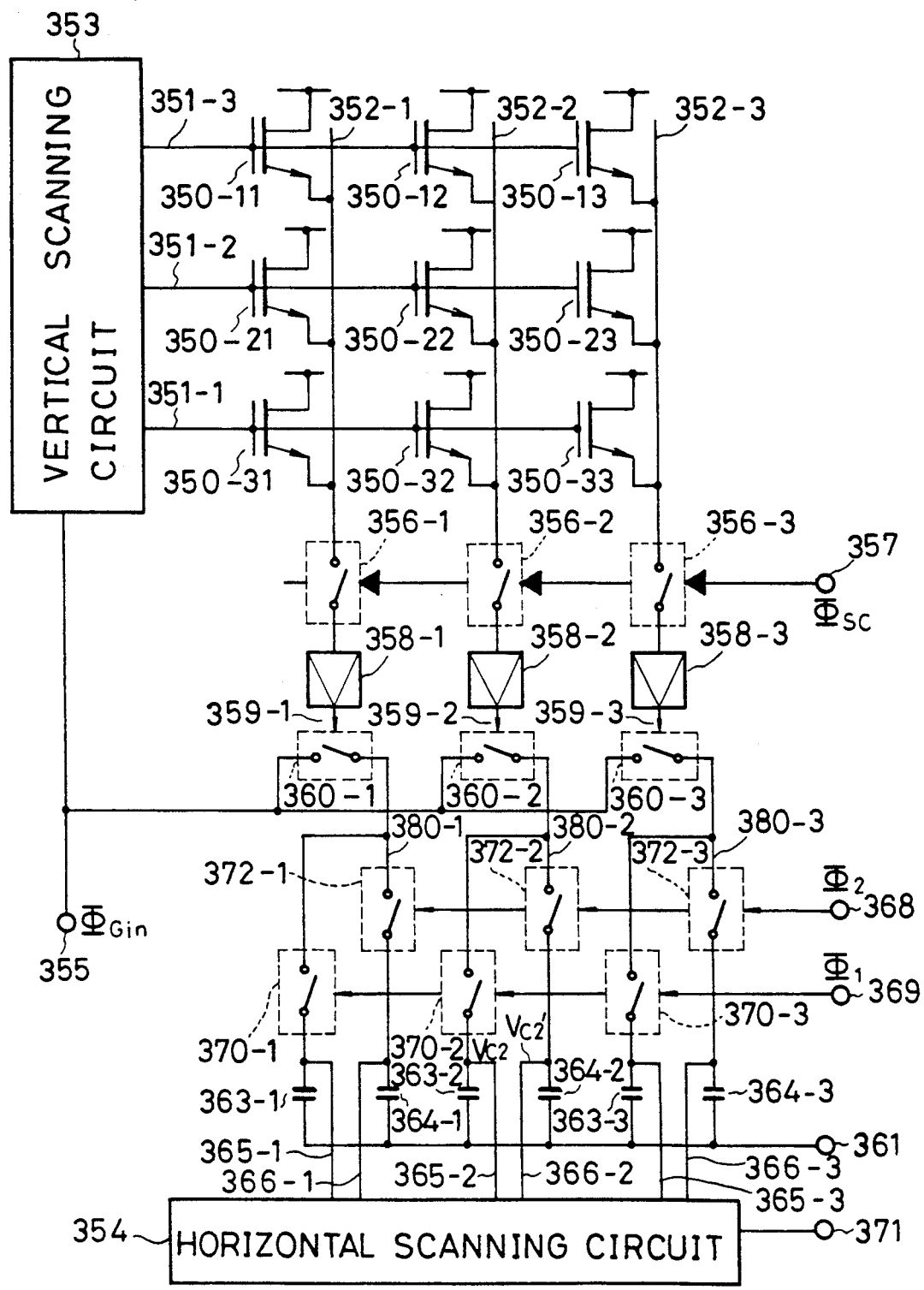
FIG. 25 is a circuit diagram showing an eighth embodiment.

FIG. 25 is a circuit diagram for explaining the configuration of an eighth embodiment of the present invention. In this embodiment, the readout means of the fourth embodiment shown in FIG. 16 is applied to a CMD area sensor. CMDs 350-11, 350-12, ..., 350-33 constituting respective pixels are arranged in the form of a matrix, and not-shown video voltage $V_{DD}$ (>0) is commonly applied to respective drains of the CMDs. Respective gate terminals of a group of CMDs in each row arrayed in the X-direction are commonly connected to corresponding one of row line select lines 351-1, 351-2, 351-3 connected to a vertical scanning circuit 353. Respective source terminals of a group of CMDs in each column arrayed in the Y-direction are commonly connected to corresponding one of column lines 352-1, 352-2, 352-3 in turn respectively connected to one ends of switches 356-1, 356-2, 356-3 of which opening and closing operations are controlled by an input from a control terminal 357. The other ends of the switches 356-1, 356-2, 356-3 are respectively connected to input terminals of operating point detection circuits 358-1, 358-2, 358-3. An output terminal 359-1 of the operating point detection circuit 358-1 is connected to a sample/hold switch 360-1 to control opening and closing operations thereof, the switch 360-1 having one end connected to an input terminal 355 in turn connected the vertical scanning circuit 353.

Meanwhile, the other end 380-1 of the sample/hold switch 360-1 is connected to a switch 370-1 having one end thereof connected to a signal voltage hold capacitor 363-1, and also to the other end of a switch 372-1 having one end thereof connected to a signal voltage hold capacitor 364-1. Opening and closing operations of the switch 370-1 is controlled by a control signal $\Phi_1$ applied to a control terminal 369 of the switch 370-1, whereas opening and closing operations of the switch 372-1 is controlled by a control signal $\Phi_2$ applied to a control terminal 368 of the switch 372-1. Operating point detection circuits 358-2, 358-3 and their output terminals 359-2, 359-3, the control terminal 368, the switches 372-2, 372-3, the control terminal 369, switches 370-2, 370-3, and the sample/hold switches 360-2, 360-3 are interconnected in a like manner to the above and their circuit arrangements will not be thus explained here.

Commonly connected one ends of the sample/hold switches 360-1, 360-2, 360-3 are commonly connected to an input terminal 355 in turn connected to the vertical scanning circuit 353 for reading respective signals of the CMDs. The signal voltages held by the signal voltage hold capacitors 363-1, 363-2, 363-3 and 364-1, 364-2, 364-3 are sequentially outputted by a horizontal scanning circuit 354 from respective joint points 365-1, 365-2, 365-3; 366-1, 366-2, 366-3 to a signal output terminal 371.

The horizontal scanning circuit 354 can be constituted by using one equivalent to a horizontal scanning circuit for sequentially reading, per column line, differential voltages between signal voltages stored in signal charge hold capacitors and noise-equivalent voltages stored in noise information hold capacitors provided to hold noise information separately from the signal charge hold capacitors, or a horizontal scanning circuit for sequentially reading both the above voltages in parallel, which circuit is used in an FGA image sensor disclosed in IEEE TRANSACTIONS ON ELECTRON DEVICES, VOL. 35, NO. 5, MAY 1988, pp. 646–652 and Japanese Patent Laid-Open No. 64-14959, as well as a BASIS image sensor disclosed in Technical Report of Electron Communication Society of Japan, ICD 89-122, pp. 79–86 (Sep., 1988). Therefore, operation of the horizontal scanning circuit 354 will not be described here in detail. The other ends of the signal voltage hold capacitors 363-1, 363-2, 363-3 and 364-1, 364-2, 364-3 are commonly connected to a common bias terminal 361 to which reference voltage is applied externally.

Figure 26:
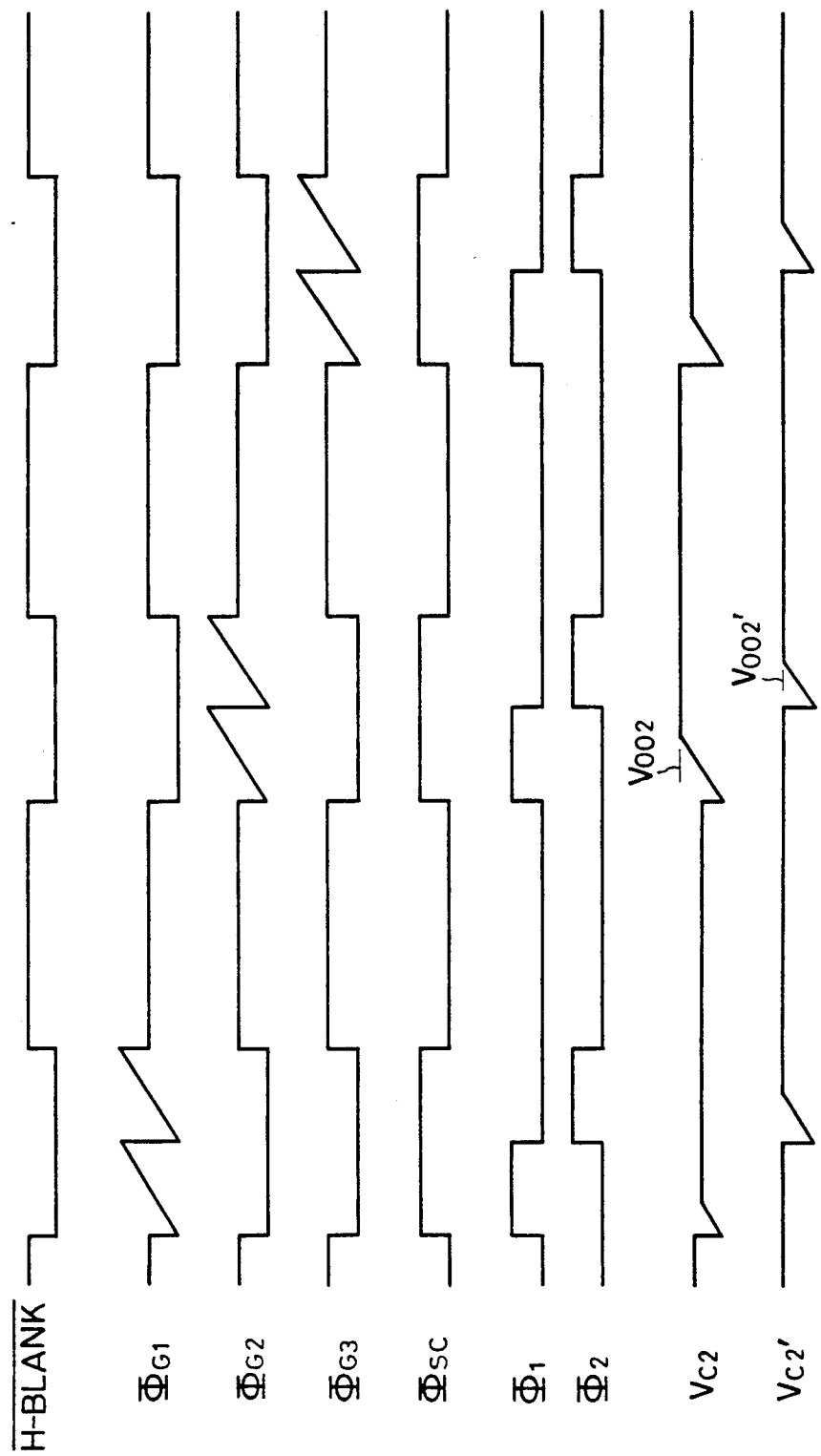
FIG. 26 is a chart of signal waveforms at various points for explaining operation of the eighth embodiment.

Operation of this embodiment will be explained below with reference to FIG. 26 showing a chart of signal waveforms at various points. H-BLANK is a signal indicating the timing of a horizontal blanking period of a video signal. A low-voltage portion of this signal corresponds to the horizontal blanking period. $\Phi_{Gin}$ stands for a bias applied to the terminal 355 in FIG. 25. This bias is applied to selected one of the row line select lines only during the horizontal blanking period, and also to one ends of the sample/hold switches 360-1, 360-2, 360-3. During each horizontal blanking period, the vertical scanning circuit 353 outputs the bias applied to the terminal 355 in FIG. 25 to the selected row line select line, and also potential of deeply negative level to the non-selected row line select lines so that the CMDs connected to those lines are turned off to prevent source currents from flowing through the CMDs. The above process is represented by $\Phi_{G1}$, $\Phi_{G2}$, $\Phi_{G3}$.

Other than the horizontal blanking period, i.e., during an effective period of the video signal, since the horizontal scanning circuit 354 and the signal voltage hold section per column line are disconnected from the pixel array section made up by the CMDs by operations of the switches 356-1, 356-2, 356-3 as described later, potential of each row line select line may be at any level of voltage so long as a biased state is generated enough to integrate holes photo-produced below respective gate field surfaces of the CMDs serving as the pixels.

On the other hand, the opening and closing operations of the switches 356-1, 356-2, 356-3, to which the column lines connected to the respective sources of the CMDs are connected, are controlled by an input signal $\Phi_{SC}$ from the control terminal 357 such that the switches are closed only during the horizontal blanking period of the video signal and opened in the remaining period. Consider now the CMDs 350-12, 350-22, 350-32 having their source terminals connected to one end of the switch 356-2, by way of example. During the first video signal blanking period, the CMDs other than those connected to the row line select line 351-1 are not selected. Applied to the gate terminal of the CMD 350-32 is potential having a sawtooth shape that slowly ascends from integrating potential $V_{INT}$ to reset potential $V_{RST}$ and then quickly descends back to the integrating potential $V_{INT}$ twice or two cycles. The operating point detection circuit 358-2 is designed to change its output at a predetermined operating point in the course of transition of the CMD from an off-stage to an on-state.

A control signal $\Phi_1$ applied to the control terminal 369 is a signal to turn on the switch 370-2 for only a period corresponding to the first cycle of the period in which $\Phi_{G1}$ outputs the two sawtooth pulses, and a control signal $\Phi_2$ applied to the control terminal 368 is a signal to turn on the switch 372-2 for only a period corresponding to the second cycle of the period in which $\Phi_{G1}$ outputs the two sawtooth pulses. On the other hand, when $\Phi_{G1}$ enters the period corresponding to the first cycle of the period in which $\Phi_{G1}$ outputs the two sawtooth pulses, the CMD 350-32 transits from an off-state to an on-state so that the gate potential corresponding to the predetermined operating point of the CMD in a bright state under exposure is sampled and held in the signal voltage hold capacitor 363-2 based on the potential of the gate pulse outputted in the form of a sawtooth wave.

Then, when $\Phi_{G1}$ reaches the reset potential $V_{RST}$, holes produced by light and integrated below the gate field surface of the CMD 1 are discharged to perform reset operation. Accordingly, when $\Phi_{G1}$ enters the period corresponding to the second cycle of the period in which $\Phi_G$ outputs the two sawtooth pulses, the CMD also transits from an off-state to an on-state so that the gate potential corresponding to the predetermined operating point of the CMD in a dark state is sampled and held in the signal voltage hold capacitor 364-2 based on the potential of the gate pulse outputted in the form of a sawtooth wave.

Stated otherwise, the gate potential corresponding to the exposure amount per gate pulse is sampled and held in the signal voltage hold capacitor 363-2, whereas the gate potential corresponding to a dark state is sampled and held in the signal voltage hold capacitor 364-2. Potential changes at the joint points 365-2, 366-2 of the signal voltage hold capacitors 363-2, 364-2 are respectively indicated by $V_{C2}$, $V_{C2}'$ in FIG. 26. As a result, the signal voltage is given by a difference between voltages which appear across the signal voltage hold capacitors 363-2 and 364-2, respectively, after completion of the period in which the pulse $\Phi_{G1}$ generates two cycles of the sawtooth pulses while changing from the integrating potential $V_{INT}$ to the reset potential $V_{RST}$ and then back to the integrating potential $V_{INT}$ twice. Upon the horizontal scanning circuit 354 being operated within an effective period of a video signal subsequent to the video signal blanking period by which the above operation is carried out, the voltage corresponding to the above differential signal is delivered to the signal output terminal 371 at the predetermined timing.

Then, during the second video signal blanking period, since the ones other than the row line select line 351-2 are not selected, the gate voltage $V_{OO2}$ corresponding to an exposure amount of the CMD 350-22 is held by the signal voltage hold capacitor 363-2, and the gate voltage $V_{OO2}'$ corresponding to a dark state is held by the signal voltage hold capacitor 364-2. Upon the horizontal scanning circuit 354 being operated within an effective period of a subsequent video signal, the voltage corresponding to the above differential signal is delivered to the signal output terminal 371 at the predetermined timing.

Thereafter, the process of holding the gate voltage corresponding to an exposure amount of the CMD, of which source terminal is connected to the column line 352-2, in the signal voltage hold capacitor 353-2, holding the gate voltage corresponding to a dark state in the signal voltage hold capacitor 364-2, and delivering those gate voltages to the signal output terminal 371 at the predetermined timing upon the horizontal scanning circuit 354 being operated within a subsequent effective period of a video signal will be successively repeated in a like manner.

With this embodiment, on the same grounds as those stated in connection with the first embodiment, photoelectric conversion characteristics representing the relation between the exposure amount and the output signal exhibits very good linearity, and the output signal is less affected by temperature characteristics of the CMD, thereby permitting the present area image sensor to provide a more satisfactory signal than the prior art. Further, since the output signal is obtained by utilizing the fact that a gate voltage - source current characteristic of the CMD constituting each pixel is shifted by an amount of the gate voltage depending on the exposure amount, and taking out a signal representing only the shift voltage based on the difference between the output characteristics in bright and dark states, it is possible to provide a highly homogeneous video signal which will not be affected by variations in the characteristics of the CMDs constituting the respective pixels.

In addition, since the gate voltage signals corresponding to bright and dark states are sampled and held through the same switches 360-1, 360-2, 360-3, errors and noises incidental to the opening and closing operations of these switches evenly occur in both the signals during the bright and dark states. Therefore, by differentially calculating a difference between the signals during the bright and dark states in a downstream stage, it is possible to minimize an influence of the errors and noises incidental to the opening and closing operations of the switches, and to obtain the more satisfactory output signal.

Figure 27:
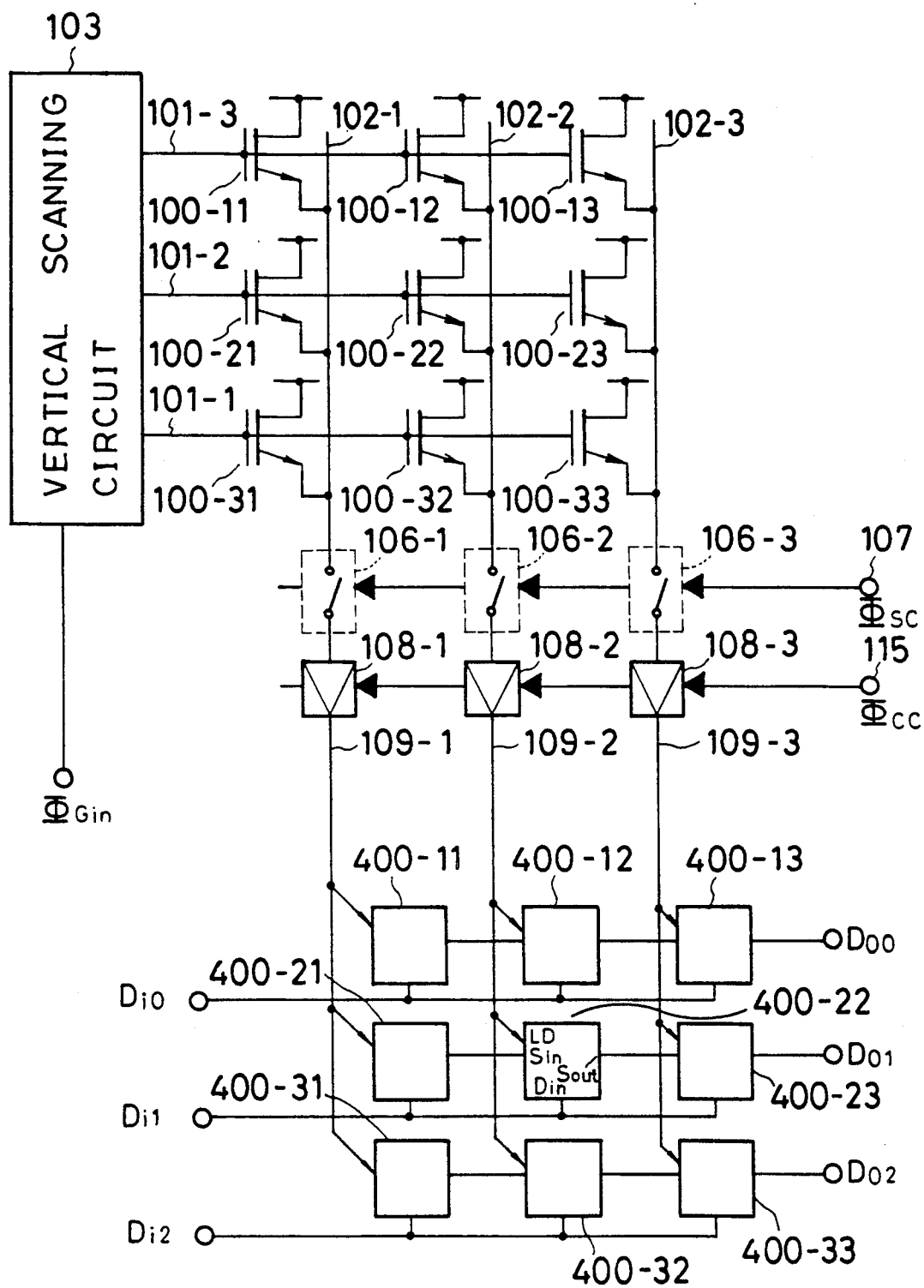
FIG. 27 is a circuit diagram showing a ninth embodiment.
Figure 28:
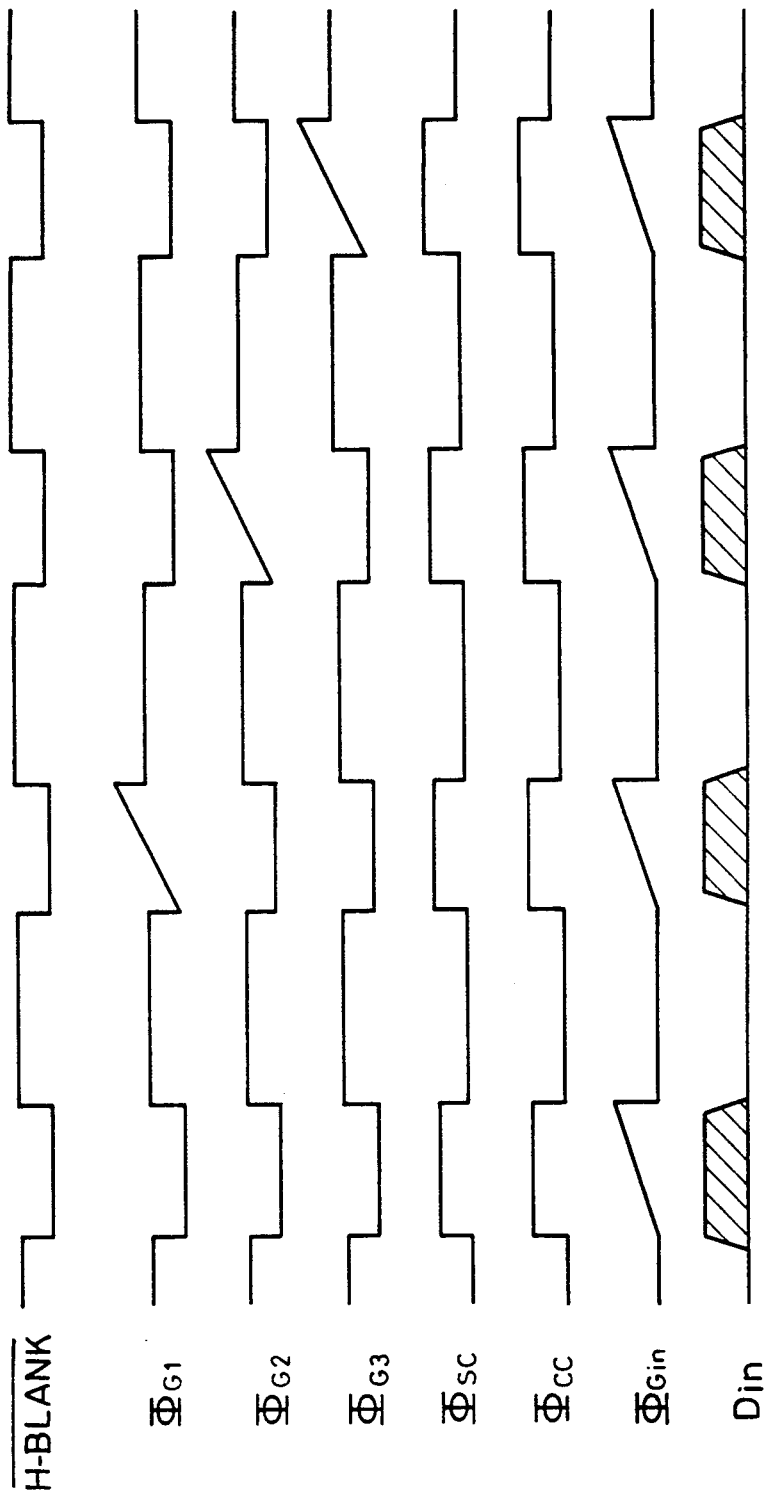
FIG. 28 is a chart of signal waveforms at various points for explaining operation of the ninth embodiment.

Next, a ninth embodiment of the present invention will be described with reference to FIG. 27. This embodiment is designed to obtain digital output signals corresponding to the respective signals of the pixels in the fifth embodiment shown in FIG. 19. More specifically, as shown in FIG. 27, shift register cells 400-11, 400-12, ..., 400-33 in plural stages are respectively connected to the output terminals 109-1, 109-2, 109-3 of the operating point detection circuits 108-1, 108-2, 108-3 so that the digital signals corresponding to signal levels of the applied bias $\Phi_{Gin}$ as developed when the operating point detection circuits 108-1, 108-2, 108-3 are inverted in their outputs are held in the shift register cells 400-11, 400-12, ..., 400-33. Then, during a subsequent video signal period, the shift register cells are operated in parallel to successively obtain the digital output signals corresponding to the respective signals of the pixels. In FIG. 27, $D_{i0}$, $D_{i1}$, $D_{i3}$ denote digital signal input terminals and $D_{o0}$, $D_{o1}$, $D_{o3}$ denote digital signal output terminals. Further, FIG. 28 is a chart showing signal waveforms at various points in which $D_{in}$ denotes a digital code corresponding to $\Phi_{Gin}$. Note that notation of the digital signals is not limited to a binary code and may be of other suitable digital code such as a Gray code.

Figure 29:
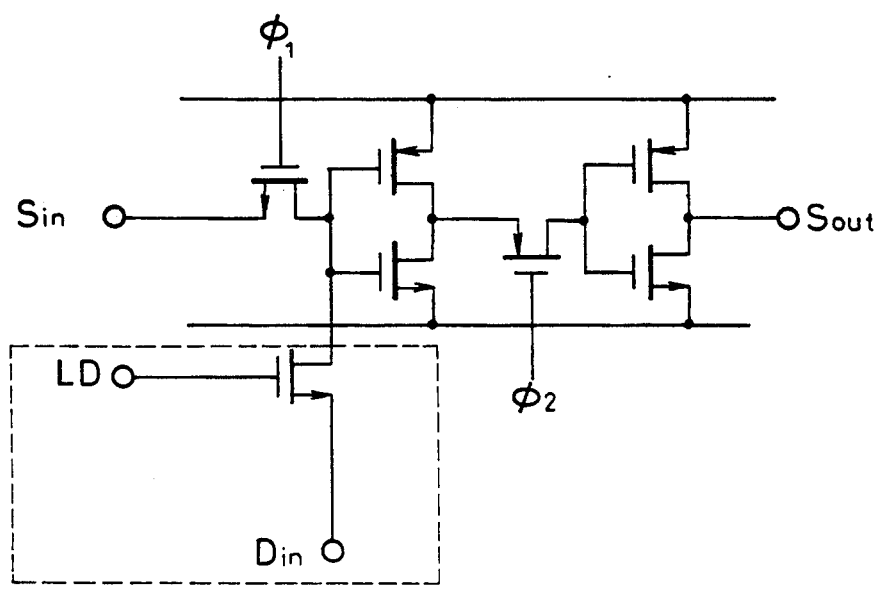
FIG. 29 is a diagram showing one example of configuration of a shift register cell.
Figure 30:
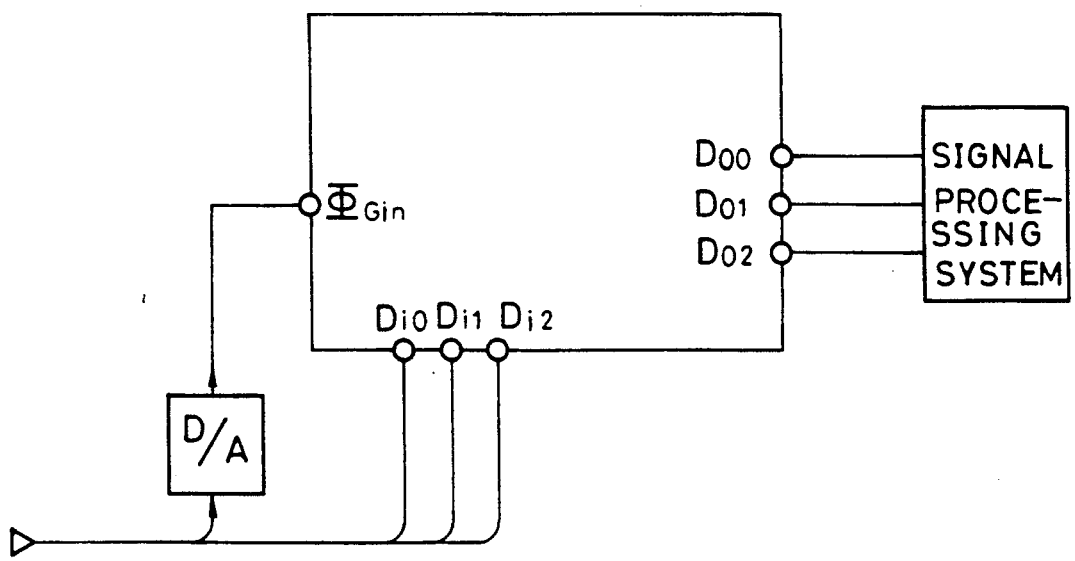
FIG. 30 is a diagram showing one example of configuration of a digital signal input section.

One example of configuration of the shift register cells 400-11, 400-12, ..., 400-33 is shown in FIG. 29. In this example, a circuit arrangement except the portion enclosed by dotted lines is the same as the circuit described in the book by D. G. Ong, "Modern Mos Technology", p. 206 FIGS. 9-24(b). One example of configuration of an input section for $\Phi_{Gin}$ and $D_{in}$ is shown in FIG. 30. While this example is illustrated as D/A-converting a digital input to produce the analog input $\Phi_{Gin}$, an analog input may be A/D-converted to produce the digital input $D_{in}$.

The embodiment shown in FIG. 27 can provide the digital video signal without requiring an expensive, high-speed A/D converter externally.

Also in the eighth embodiment shown in FIG. 25, the circuit arrangement may be modified so as to easily hold digital signals corresponding to bright and dark states. This modification does not need signal processing such as pre-amplification unlike the case of analog output. Therefore, the output signal is less affected variations in characteristics of the signal processing systems between bright and dark output channels, and can be provided with a higher S/N ratio.

Figure 31:
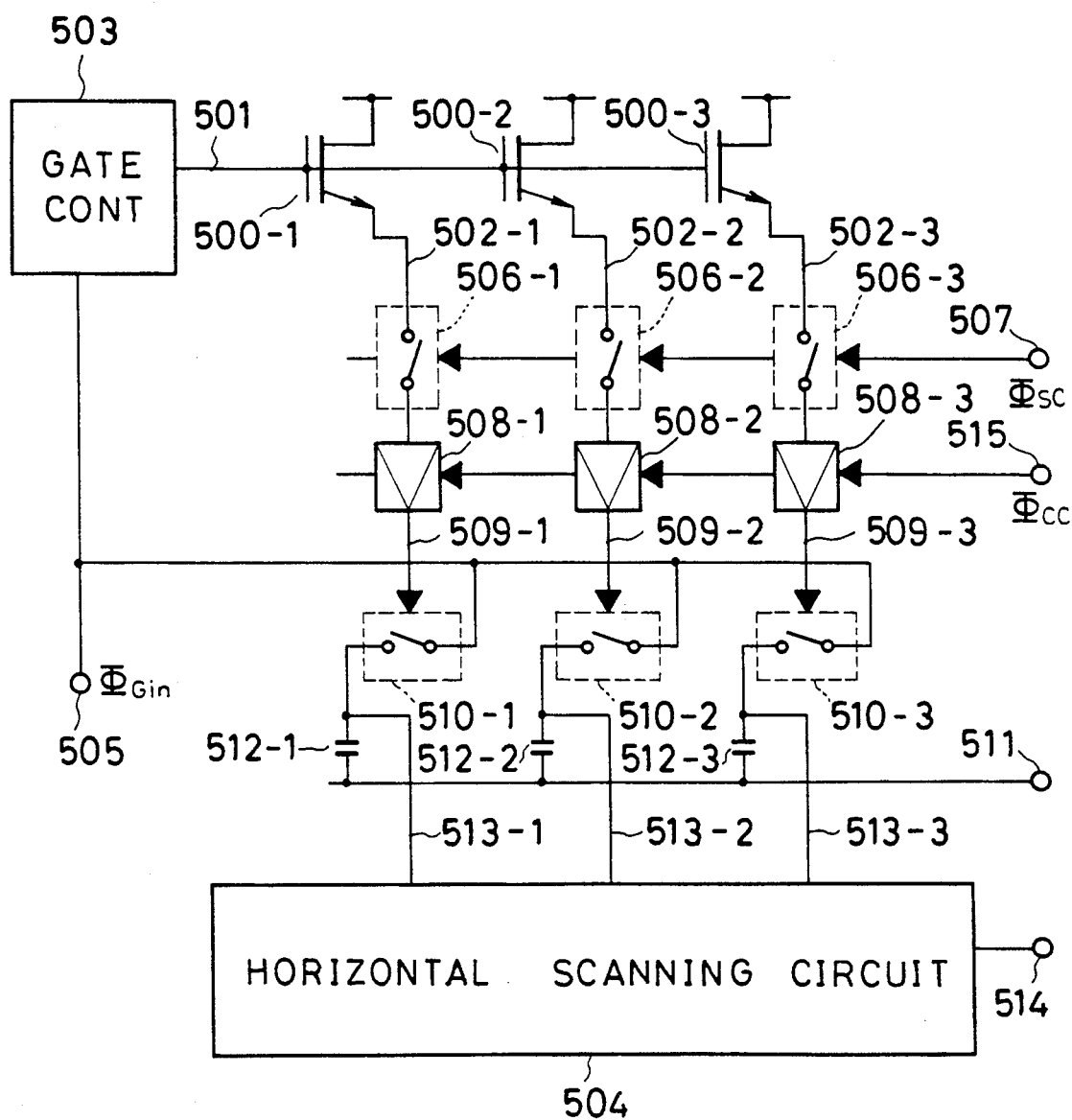
FIG. 31 is a circuit diagram showing a tenth embodiment.

Next, a tenth embodiment of the present invention will be described with reference to FIG. 31. In this embodiment, the read means of the first embodiment shown in FIG. 4 is applied to a CMD line sensor. CMDs 500-1, 500-2, ..., 500-3 constituting respective CMD pixels are arranged in the form of a line and not-shown video voltage $V_{DD}(>0)$ is commonly applied to respective drains of the CMDs. Respective gate terminals of a group of CMDs are commonly connected to a gate line 501 outputted from a control circuit 503. Respective source terminals of the CMDs are respectively connected to source lines 502-1, 502-2, 502-3 in turn connected to one ends of switches 506-1, 506-2, 506-3 of which opening and closing operations are controlled by an input from a control terminal 507. The other ends of the switches 506-1, 506-2, 506-3 are respectively connected to input terminals of operating point detection circuits 508-1, 508-2, 508-3 of which operations are controlled by an input from a control terminal 515. Output terminals 509-1, 509-2, 509-3 of the operating point detection circuits 508-1, 508-2, 508-3 are respectively connected to sample/hold switches 510-1, 510-2, 510-3 for providing control signals to control opening and closing operations thereof.

The sample/hold switches 510-1, 510-2, 510-3 have their one ends commonly connected to an input terminal 505 led to the control circuit 503 for reading respective signals of the CMDs, and their opposite ends respectively connected to signal voltage hold capacitors 512-1, 512-2, 512-3 for holding respective gate potentials corresponding to exposure amounts of the CMDs. The signal voltages held by the signal voltage hold capacitors 512-1, 512-2, 512-3 are sequentially outputted by a horizontal scanning circuit 504 from respective joint points 513-1, 513-2, 513-3 to a signal output terminal 514.

The horizontal scanning circuit 504 can be constituted by using one equivalent to a horizontal scanning circuit for sequentially reading signal voltages stored in signal voltage hold capacitors per source line, which circuit is used in an FGA image sensor disclosed in IEEE TRANSACTIONS ON ELECTRON DEVICES, VOL. 35, NO. 5, MAY 1988, pp. 646-652 and Japanese Patent Laid-Open No. 64-14959, a BASIS image sensor disclosed in Technical Report of Electron Communication Society of Japan, ICD 89-122, pp. 79-86 (Sep., 1988), as well as an SIT image sensor disclosed in Technical Report of Television Society of Japan, Vol. 11, No. 28, pp. 43-47, 87-81 ID'87-104 (Nov., 1987). Therefore, operation of the horizontal scanning circuit 504 will not be described here in detail. The other ends of the signal voltage hold capacitors 512-1, 512-2, 512-3 are commonly connected to a common bias terminal 511 to which reference voltage is applied externally.

Operation of this embodiment will be explained below with reference to FIG. 32 showing a chart of signal waveforms at various points. $\Phi_{Gin}$ stands for a bias applied to the terminal 505 in FIG. 31. This bias is applied to the gate line 501 selected only during a signal transfer period, and also to one ends of the sample/hold switches 510-1, 510-2, 510-3 commonly connected to each other. During each signal transfer period $T_1$, the control circuit 503 outputs the bias $\Phi_{Gin}$ applied to the terminal 505 in FIG. 31 to the gate line 501. The above process is represented by $\Phi_G$.

During a signal readout period $T_2$, since the horizontal scanning circuit 504 and the signal voltage hold section per source line are disconnected from the pixel line made up by the CMDs by operations of the switches 506-1, 506-2, 506-3 as described later, potential of the gate line may be at any level of voltage so long as a biased state is generated enough to integrate holes photo-produced below respective gate field surfaces of the CMDs serving as the pixels.

On the other hand, the opening and closing operations of the switches 506-1, 506-2, 506-3, to which the respective source lines of the CMDs are connected, are controlled by an input signal $\Phi_{SC}$ from the control terminal 507 such that the switches are closed only during the signal transfer period of the video signal and opened in the remaining period. The operating point detection circuits 508-1, 508-2, 508-3 are controlled by an input signal $\Phi_{CC}$ from the control terminal 515 such that they serve as operating point detection circuits only during a period in which $\Phi_{CC}$ is at a high level, and generate control signals to keep the sample/hold switches 510-1, 510-2, 510-3 in a held state regardless of any input during a period in which $\Phi_{CC}$ is at a low level.

Consider now the signal voltage hold capacitor 512-1, by way of example. During the signal transfer period, the gate voltage $V_{OO1}$ corresponding to an exposure amount of the CMD 500-1 is held by the signal voltage hold capacitor 512-1, so that the joint point 513-1 between the capacitor 512-1 and the horizontal scanning circuit 504 takes potential $V_{C1}$. Upon the horizontal scanning circuit 504 being operated within a subsequent signal read period, the potential corresponding to the voltage held by the signal voltage hold capacitor 512-1 is delivered to the signal output terminal 514 at the predetermined timing. The terminals connected to the capacitors 512-2, 512-3 are also operated in a like manner so that potentials at the joint points 513-2, 513-3 become $V_{C2}$, $V_{C3}$ which are successively outputted to the signal output terminal 514.

With this embodiment, on the same grounds as those stated in connection with the first embodiment, photoelectric conversion characteristics representing the relation between the exposure amount and the output signal exhibits very good linearity, and the output signal is less affected by temperature characteristics of the CMD, thereby permitting the present line sensor to provide a more satisfactory signal than the prior art.

With the photoelectric conversion device according to the present invention, as described above in conjunction with the embodiments, since the device is arranged to handle, as a photoelectrically converted signal, the control voltage required to flow a predetermined output current through a photoelectric transducer with an amplifying function, photoelectric conversion characteristics exhibit good linearity and output fluctuations depending on temperature changes is reduced. In addition, since the photoelectric transducers are arrayed in the form of a matrix and a difference signal between two signals in bright and dark states is outputted as a photoelectric conversion signal, it is possible to provide the photoelectrically converted signal of good quality which is much less affected by variations in characteristics of the photoelectric transducers and has a reduced level of fixed pattern noise.

What is claimed is:

1. A photoelectric conversion device consisting of one Charge Modulation Device as a photoelectric transducer with an amplifying function which has a region for integrating electric charges produced by light therein and a control gate electrode capacity-coupled to said region, comprising:
   a control circuit for applying a control signal having a monotonously rising or falling portion to the control gate electrode of said photoelectric transducer,
   an operating point detection circuit for receiving an output signal from said source electrode of said photoelectric transducer and inverting an output state thereof depending on a level of said output signal, and
   a sample/hold circuit controlled by an output of said operating point detection circuit to hold a signal level of said control signal applied to the control gate electrode of said photoelectric transducer as developed when the output state of said operating point detection circuit is inverted,
   wherein the signal held by said sample/hold circuit is read out as a photoelectrically converted output.

2. A photoelectric conversion device consisting of one Charge Modulation Device photoelectric transducer with an amplifying function which has a region for integrating electric charges produced by light therein and a control gate electrode capacity-coupled to said region, comprising:
   a control circuit for applying a first control signal having a monotonously rising or falling portion to a control gate electrode of said photoelectric transducer, then resetting signal charges integrated in said photoelectric transducer, and thereafter applying a second control signal having a monotonously rising or falling portion to said control gate electrode,
   an operating point detection circuit for receiving an output signal from said source electrode of said photoelectric transducer and inverting an output state thereof depending on a level of said output signal,
   a first sample/hold circuit controlled by an output of said operating point detection circuit to hold a signal level of said first control signal applied to the control gate electrode of said photoelectric transducer as developed when the output state of said operating point detection circuit is inverted, and
   a second sample/hold circuit controlled by an output of said operating point detection circuit to hold a signal level of said second control signal applied to the control gate electrode of said photoelectric transducer as developed when the output state of said operating point detection circuit is inverted,
   wherein the signals held by said first and second sample/hold circuits are read through differential operation as a photoelectrically converted output.

3. A photoelectric conversion device including a pixel array in which each pixel consists of one Charge Modulation Device as a photoelectric transducer with an amplifying function, each said photoelectric transducer having a region for integrating electric charges produced by light therein and a control gate electrode capacity-coupled to said region, and said pixels are arranged in the form of a matrix, comprising:
   a vertical select control circuit to which respective control gate electrodes of the pixels arrayed in the direction of row of said pixel array are commonly connected for selectively applying a control signal having a monotonously rising or falling portion to said control gate electrodes row by row,
   operating point detection circuits respectively connected to column lines of said pixel array, to each of which output terminals of the pixels arrayed in the direction of column of said pixel array are commonly connected, for receiving output signals from said pixels and inverting output states thereof depending on levels of said output signals,
   sample/hold circuits controlled by outputs of said operating point detection circuits to hold signal levels of said control signal selectively applied to the control gate electrodes of said pixels as developed when the output states of said operating point detection circuits are inverted, and
   a horizontal scanning circuit for successively reading the signals held by said sample/hold circuits.

4. A photoelectric conversion device including a pixel array in which each pixel consists of one Charge Modulation Device as a photoelectric transducer with an amplifying function, each said photoelectric transducer having a region for integrating electric charges produced by light therein and a control gate electrode capacity-coupled to said region, and said pixels are arranged in the form of a matrix, comprising:

a vertical select control circuit to which respective control gate electrodes of the pixels arrayed in the direction of row of said pixel array are commonly connected for selectively applying a first control signal having a monotonously rising or falling portion to said control gate electrodes, then resetting signal charges integrated in said pixels, and thereafter applying a second control signal having a monotonously rising or falling portion to said control gate electrodes row by row, operating point detection circuits respectively connected to column lines of said pixel array, to each of which output terminals of the pixels arrayed in the direction of column of said pixel array are commonly connected, for receiving output signals from said pixels and inverting output states thereof depending on levels of said output signals, first sample/hold circuits controlled by outputs of said operating point detection circuits to hold signal levels of said first control signal selectively applied to the control gate electrodes of said pixels as developed when the output states of said operating point detection circuits are inverted, second sample/hold circuits controlled by outputs of said operating point detection circuits to hold signal levels of said second control signal selectively applied to the control gate electrodes of said pixels as developed when the output states of said operating point detection circuits are inverted, and a horizontal scanning circuit for successively reading the signals held by said first and second sample/hold circuits, wherein the first and second read signals from said horizontal scanning circuit are differentially calculated to be given as a photoelectrically converted output.

5. A photoelectric conversion device according to claim 3, wherein said device includes a circuit for generating a digital signal corresponding to said control signal, signal levels corresponding to the control signals held by said sample/circuits are held as digital signals, and said digital signals held by said sample/hold circuits are successively read by said horizontal scanning circuit.

6. A photoelectric conversion device according to claim 4, wherein said device includes circuits for generating signals corresponding to said first and second control signals, signal levels corresponding to the first and second control signals held by said first and second sample/hold circuits are held as digital signals, and said digital signals held by said first and second sample/hold circuits are successively read by said horizontal scanning circuit.

7. A photoelectric conversion device including a pixel line in which each pixel consists of one Charge Modulation as a photoelectric transducer with an amplifying function, each said photoelectric transducer having a region for integrating electric charges produced by light therein and a control gate electrode capacity-coupled to said region, and said pixels are arranged in the form of a line, comprising:

a control circuit to which respective control gate electrodes of the pixels in said pixel line are commonly connected for applying a control signal having a monotonously rising or falling portion to said control gate electrodes, operating point detection circuits for receiving output signals from said pixels and inverting output states thereof depending on levels of said output signals, sample/hold circuits controlled by outputs of said operating point detection circuits to hold signal levels of said control signal applied to the control gate electrodes of said pixels as developed when the output states of said operating point detection circuits are inverted, and a horizontal scanning circuit for successively reading the signals held by said sample/hold circuits.

* * * * *